(12) United States Patent
Jerome et al.

(10) Patent No.: US 12,296,545 B2
(45) Date of Patent: May 13, 2025

(54) CONTINUOUS-LINE MANUFACTURING SYSTEM AND METHOD FOR COMPOSITE PARTS

(71) Applicant: The Boeing Company, Chicago, IL (US)

(72) Inventors: Jace J. Jerome, Renton, WA (US); Richard A. Miller, Seattle, WA (US); Michael K. Louie, Renton, WA (US); Jordan S. Erickson, Federal Way, WA (US); Austin T. McAnelly, Tacoma, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/502,179

(22) Filed: Oct. 15, 2021

(65) Prior Publication Data
US 2022/0152946 A1    May 19, 2022

Related U.S. Application Data

(60) Provisional application No. 63/115,643, filed on Nov. 19, 2020.

(51) Int. Cl.
*B29C 70/38* (2006.01)
*B29C 70/54* (2006.01)

(52) U.S. Cl.
CPC ............ *B29C 70/382* (2013.01); *B29C 70/54* (2013.01)

(58) Field of Classification Search
CPC ......... B29C 70/32; B29C 70/34; B29C 70/36; B29C 70/38; B29C 70/382; B29C 70/54; G05B 19/4182; B23Q 3/088
See application file for complete search history.

(56) References Cited

U.S. PATENT DOCUMENTS

| 3,929,386 A | * | 12/1975 | Read ..................... A47B 88/483 |
| | | | 384/22 |
| 7,282,107 B2 | | 10/2007 | Johnson et al. |
| 7,527,222 B2 | | 5/2009 | Biornstad et al. |
| 9,817,402 B1 | * | 11/2017 | Ayyagari ............. G05D 1/0212 |
| 2009/0226292 A1 | | 9/2009 | Habisreitinger |

(Continued)

FOREIGN PATENT DOCUMENTS

| DE | 10 2013212332 | 12/2014 |
| EP | 3 653 369 | 5/2020 |

OTHER PUBLICATIONS

European Patent Office, Extended European Search Report, App. No. 21187746.9 (Jan. 19, 2022).

(Continued)

*Primary Examiner* — Yunju Kim
(74) *Attorney, Agent, or Firm* — Walters & Wasylyna LLC

(57) ABSTRACT

A method for depositing composite material onto a tool using an automated machine. The method includes coupling a first mobile platform with a second mobile platform to form a coupled system, the first mobile platform supporting the automated machine and the second mobile platform supporting the tool. The method further includes indexing the automated machine relative to the tool. The method further includes depositing composite material from the automated machine onto the tool while the coupled system moves along a production line.

20 Claims, 15 Drawing Sheets

(56) References Cited

U.S. PATENT DOCUMENTS

| | | | |
|---|---|---|---|
| 2011/0277935 A1* | 11/2011 | Borgmann | B29C 70/38 |
| | | | 156/350 |
| 2012/0269999 A1 | 10/2012 | Kind et al. | |
| 2012/0308343 A1 | 12/2012 | Habisreitinger | |
| 2018/0056611 A1* | 3/2018 | Gintert | B29C 70/32 |
| 2020/0070973 A1* | 3/2020 | Grubb | B64C 25/68 |
| 2020/0078990 A1* | 3/2020 | Sana | B29C 33/485 |
| 2020/0139649 A1* | 5/2020 | Modin | B29C 70/384 |
| 2021/0380279 A1* | 12/2021 | Prendergast | B64F 5/10 |
| 2022/0028056 A1* | 1/2022 | Kawamata | B25J 19/023 |
| 2022/0153452 A1* | 5/2022 | Smith | B64F 5/10 |

OTHER PUBLICATIONS

European Patent Office, "Communication pursuant to Article 94(3) EPC," App. No. 21 187 746.9 (May 16, 2024).

\* cited by examiner

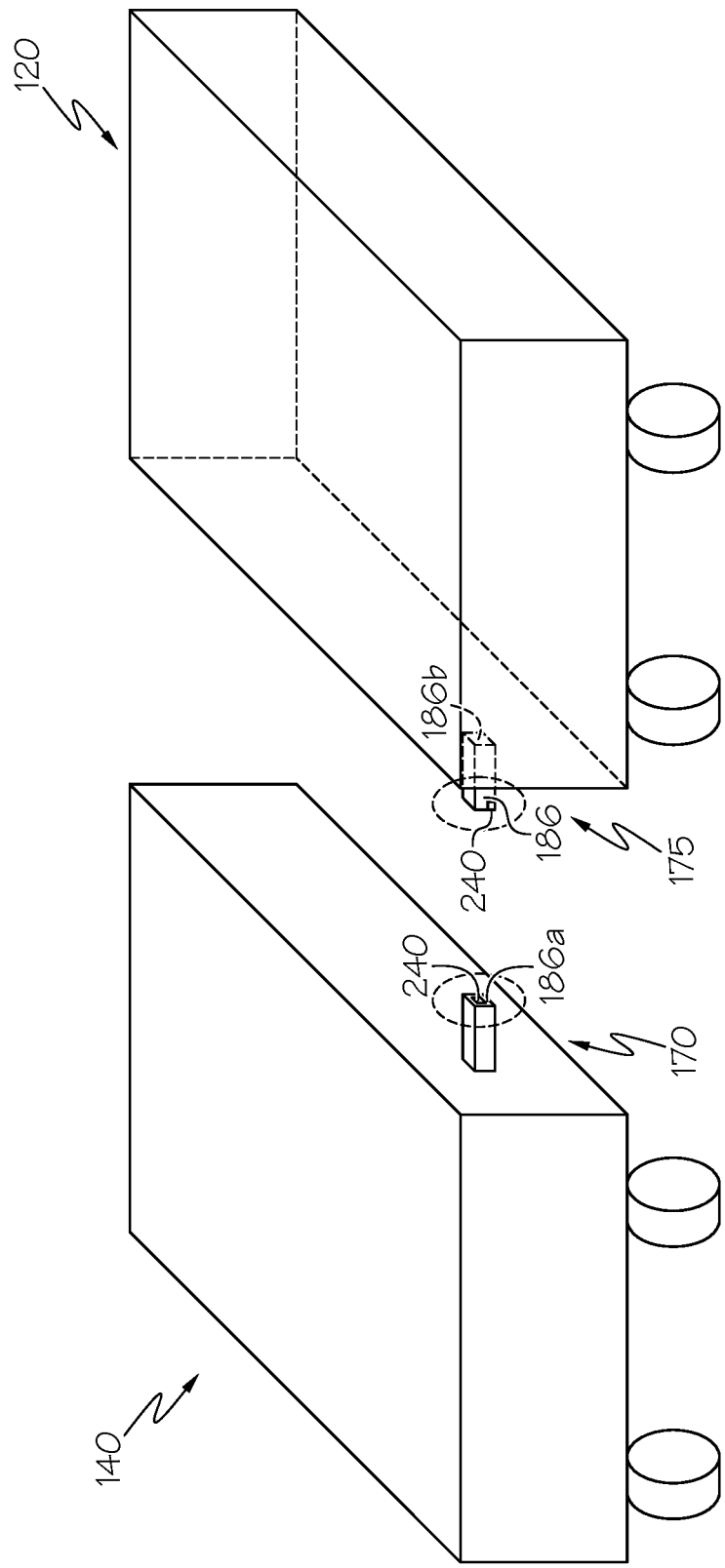

CONTINUOUS-LINE MANUFACTURING SYSTEM AND METHOD FOR COMPOSITE PARTS

PRIORITY

This application claims priority from U.S. Ser. No. 63/115,643 filed on Nov. 19, 2020.

FIELD

The present disclosure generally relates to manufacturing and, more particularly, to continuous flow manufacturing systems and an associated apparatus and methods for controlling a continuous flow manufacturing process.

BACKGROUND

Conventional manufacturing techniques for large parts, such as spars, fuselage sections, wing structures, and other aircraft structures, utilize large fixed-base machines and model-specific, fixed-base tooling. Conventional manufacturing techniques for composite parts utilize fixed-base tooling and batch processing, in which the composite part does not move from one location to another location until full lamination of the part is complete and further in which machines are stationary. Neither of these manufacturing techniques lend themselves to continuous flow manufacturing. Accordingly, the fixed nature of current manufacturing systems is limiting with respect to increasing production rates.

SUMMARY

Disclosed is an apparatus for laminating composite components on a production line.

In one example, the disclosed apparatus for laminating composite components on a production line includes an automated machine mounted on a first mobile platform guided along the production line. The apparatus further includes a tool mounted on a second mobile platform guided along the production line. The apparatus further includes a coupling feature configured to couple the first mobile platform with the second mobile platform such that the first mobile platform and the second mobile platform may travel along the production as a coupled system. The apparatus further includes a motion controller coupled with the second mobile platform and a controller. The controller is configured to detect a position of the first mobile platform, a position of the second mobile platform, and a status of the automated machine. The controller is further configured to control a status of the coupling feature, control travel parameters of the first mobile platform, and control travel parameters of the second mobile platform. The first mobile platform and the second mobile platform are configured to travel independently of each other when in an uncoupled state.

Also disclosed is a method for depositing composite material onto a tool using an automated machine.

In one example, the disclosed method for depositing composite material onto a tool using an automated machine includes coupling a first mobile platform with a second mobile platform to form a coupled system, the first mobile platform supporting the automated machine and the second mobile platform supporting the tool. The method further includes indexing the automated machine relative to the tool. The method further includes depositing composite material from the automated machine onto the tool while the coupled system moves along a production line.

Also disclosed is a manufacturing system.

In one example, the disclosed manufacturing system includes a production line, an automated machine located on a first mobile platform and configured to perform at least one manufacturing operation, a tool located on a second mobile platform, and a coupling feature configured to couple the first mobile platform with the second mobile platform to form a coupled system. The manufacturing system further includes the first mobile platform and the second mobile platform are configured to travel as the coupled system along the production line while the automated machine performs the at least one manufacturing operation.

Also disclosed is a method for laminating composite components on a tool located on a second mobile platform with an automated machine located on a first mobile platform.

In one example, the disclosed method for laminating composite components on a tool located on a second mobile platform with an automated machine located on a first mobile platform includes moving the first mobile platform to a predetermined location, coupling the first mobile platform to a second mobile platform to form a coupled system, driving the coupled system along a continuous moving production line via a motion controller, depositing composite materials from the automated machine to the tool as the coupled system moves along the continuous moving production line, uncoupling the coupled system upon completion of the depositing, returning the first mobile platform to a beginning position along the continuous moving production line, and advancing the second mobile platform to an autoclave.

Other examples of the disclosed apparatus, methods and systems will become apparent from the following detailed description, the accompanying drawings, and the appended claims.

BRIEF DESCRIPTION OF THE DRAWINGS

Some examples of the present disclosure are described with reference to the accompanying drawings. The same reference number represents the same element or the same type of element on all drawings.

FIG. 6 is a perspective view of a first mobile platform and a second mobile platform that can be used with the manufacturing system shown in FIG. 1.

DETAILED DESCRIPTION

Figure 1:
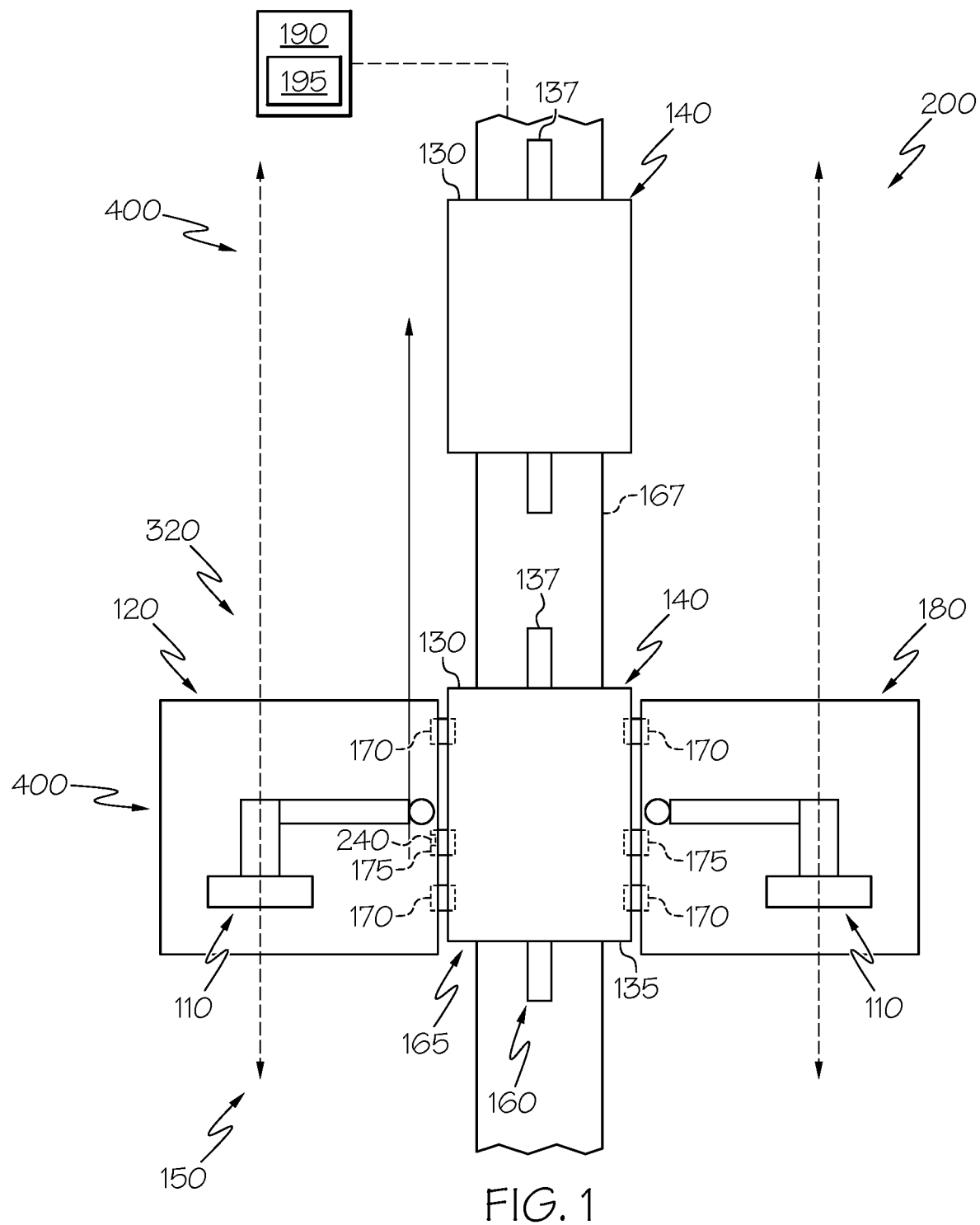
FIG. 1 is a schematic diagram of a manufacturing system in an illustrative example.

The following detailed description refers to the accompanying drawings, which illustrate specific examples described by the present disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according the present disclosure are provided below. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the terms "about," "approximately," and "generally" refer to or represent a condition that is close to, but not exactly, the stated condition that still performs the desired function or achieves the desired result. As an example, the terms "about," "approximately," and "generally" refer to a condition that is within an acceptable predetermined tolerance or accuracy. For example, the terms "about," "approximately," and "generally" refer to a condition that is within 10% of the stated condition. However, the terms "about," "approximately," and "generally" do not exclude a condition that is exactly the stated condition.

References throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

Continuous flow manufacturing is a process in which a product is manufactured, from start to finish, in one production line. Continuous flow manufacturing offers a different approach to conventional batch production techniques in which a product is fully manufactured in a single manufacturing cell or a product is partially manufactured in one independent manufacturing cell, then is moved to another independent manufacturing cell for follow-on manufacturing. The benefits and advantages of continuous flow manufacturing may include, but are not limited to, decreased work in progress requirements, decreased floor space requirements, reduced inventory, improved efficiency, reduced product defects, and reduced cycle time.

Continuous flow manufacturing requires the integration of the various elements of the production system and process to achieve continuous movement of the workpieces through the system without separating them into lots or batches. Continuous flow manufacturing also needs to quickly and accurately move tools, workpieces, and machines from one position to another and manage process-related information along the process flow path to achieve consistent quality and repeatable processing times.

Referring generally to FIGS. 1-11, by way of examples, the present disclosure is directed to manufacturing system 200, a method 100 for depositing composite material onto a tool 130, a method 300 for laminating composite components on a tool 130, and an apparatus 320 for laminating composite components on a production line 160. Throughout the present disclosure, the manufacturing system 200 may also be referred to generally as the system 200. The manufacturing system 200 facilitates continuous production of a workpiece 135, in which the workpiece 135 moves from one work process or station 400 to another in a single sequential flow of a production line 160 (i.e., continuous flow manufacturing).

The system 200, apparatus 320, method 100, and method 300 disclosed herein utilize a controller 190 to perform process management by recording and tracking process-related information, such as tool 130 information, workpiece 135 information, automated machine 110 information, and other work process information, at each stage of a continuous manufacturing process and making such process-related information available throughout the entire production line 160. One or more numerical control programs 290 may be utilized to facilitate process-related information and movement throughout the manufacturing system 200 and related processes, methods, and apparatuses.

The system 200, apparatus 320, method 100, and method 300 update the process-related information at each stage of the continuous manufacturing process by tracking movement of a manufactured workpiece 135 from stage to stage throughout the continuous manufacturing process and associating the process-related information with the corresponding workpiece 135.

The system 200, apparatus 320, method 100, and method 300 direct production by determining and retrieving the required inputs, the required work processes, and the generated outputs at each stage of the continuous manufacturing process through a controller that correspond to the workpiece 135. One or more sensors 240 may be utilized to collect such information.

The apparatus 320 advantageously tracks, manages, and controls the flow of information, work processes, automated machines 110, and workpieces 135 within the system 200, which facilitates use of continuous flow manufacturing for various types of workpieces 135, such as those that were conventionally not suited for continuous flow manufacturing.

The system 200, apparatus 320, method 100, and method 300 disclosed herein facilitate communication between the various manufacturing stages of the process by maintaining process-related information throughout the production line 160 of the continuous manufacturing process. The system 200 and method 100 disclosed herein facilitate continuous flow manufacturing of large parts, such as spars, fuselage sections, wing structures, and other aircraft structures, and/or composite parts by identifying and accurately locating non-fixed-base tooling throughout the continuous manufacturing process. The system 200 and method 100 disclosed herein further facilitate continuous flow manufacturing of large parts and/or composite parts by updating the process-related information at each manufacturing stage and transferring the process-related information throughout the continuous manufacturing processes.

Figure 10:
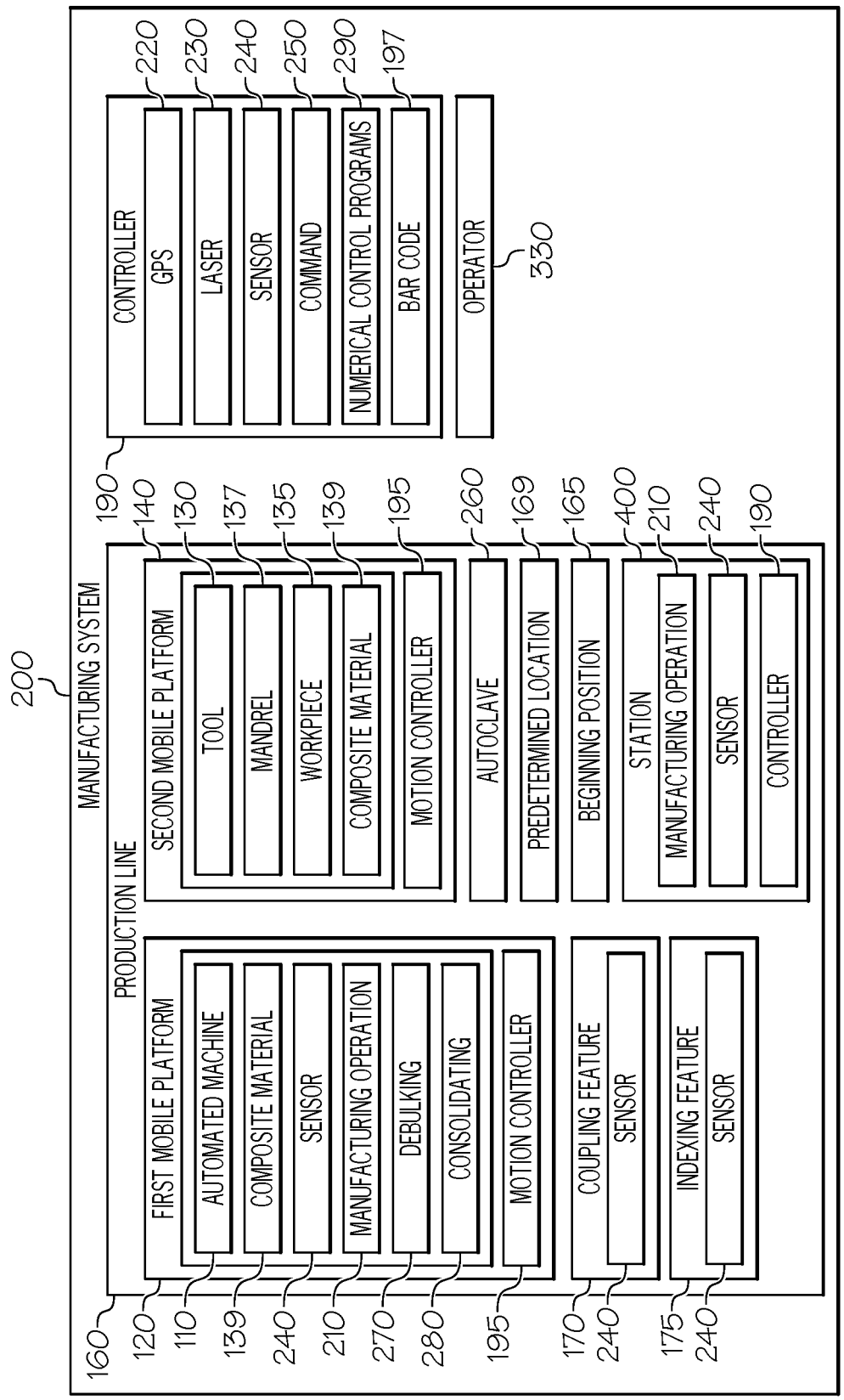
FIG. 10 is a block diagram of a manufacturing system that can be used with the method of FIG. 8 and the method of FIG. 9.

In one or more examples, the system 200, method 100, method 300, and apparatus 320 may be used to facilitate manufacturing of composite parts, i.e. workpieces 135. In one example, composite parts, such as carbon fiber reinforcement polymer parts, are initially laid-up in multiple layers that together are referred to as a laminate or "preform." Individual fibers within each layer of the laminate are aligned parallel with each other, but different layers may exhibit different fiber orientations in order to increase the strength of the resulting composite part along different dimensions. The laminate may include a viscous resin that solidifies in order to harden the laminate into a composite part (e.g., for use in an aircraft). In an example, the system 200, method 100, method 300, and apparatus 320 may be used to facilitate manufacturing of composite parts comprised of thermoplastic resins. In an example, an automated machine 110 of the system 200, method 100, method 300, and apparatus 320 is configured to perform at least one manufacturing operation 210. As illustrated in FIG. 10, the manufacturing operation 210 may include laying down a plurality of composite plies of laminate at various orientations as determined by one or more numerical control programs 290.

Referring to the figures, in one or more examples, a manufacturing system 200 includes a production line 160. The production line 160 may include a series of stations 400 arranged to achieve continuous flow manufacturing. At least one manufacturing operation 210 may be performed at each station 400. In an example, the manufacturing operation may include depositing composite material 139 onto a tool 130.

Referring to FIG. 10, in one or more examples, the manufacturing system 200 includes a first mobile platform 120 and a second mobile platform 140. One or both of the first mobile platform 120 and the second mobile platform 140 are configured to continuously move along the production line 160 via a motion controller 195. In one or more examples, the production line 160 comprises a railway 167 configured for travel of the second mobile platform 140 and the first mobile platform 120, see FIG. 1. In an example, the manufacturing system 200 includes more than one second mobile platform 140 along production line 160, see FIG. 1. In an example, the production line 160 is generally straight. In an example, the production line 160 is generally curved, for example in a looped line configuration like a race track. While the examples presented are designed for a continuous flow system, it is contemplated that in one or more examples, one or both of the first mobile platform 120 and the second mobile platform 140 are configured to move in pulses of any time duration along the production line 160.

Figure 2:
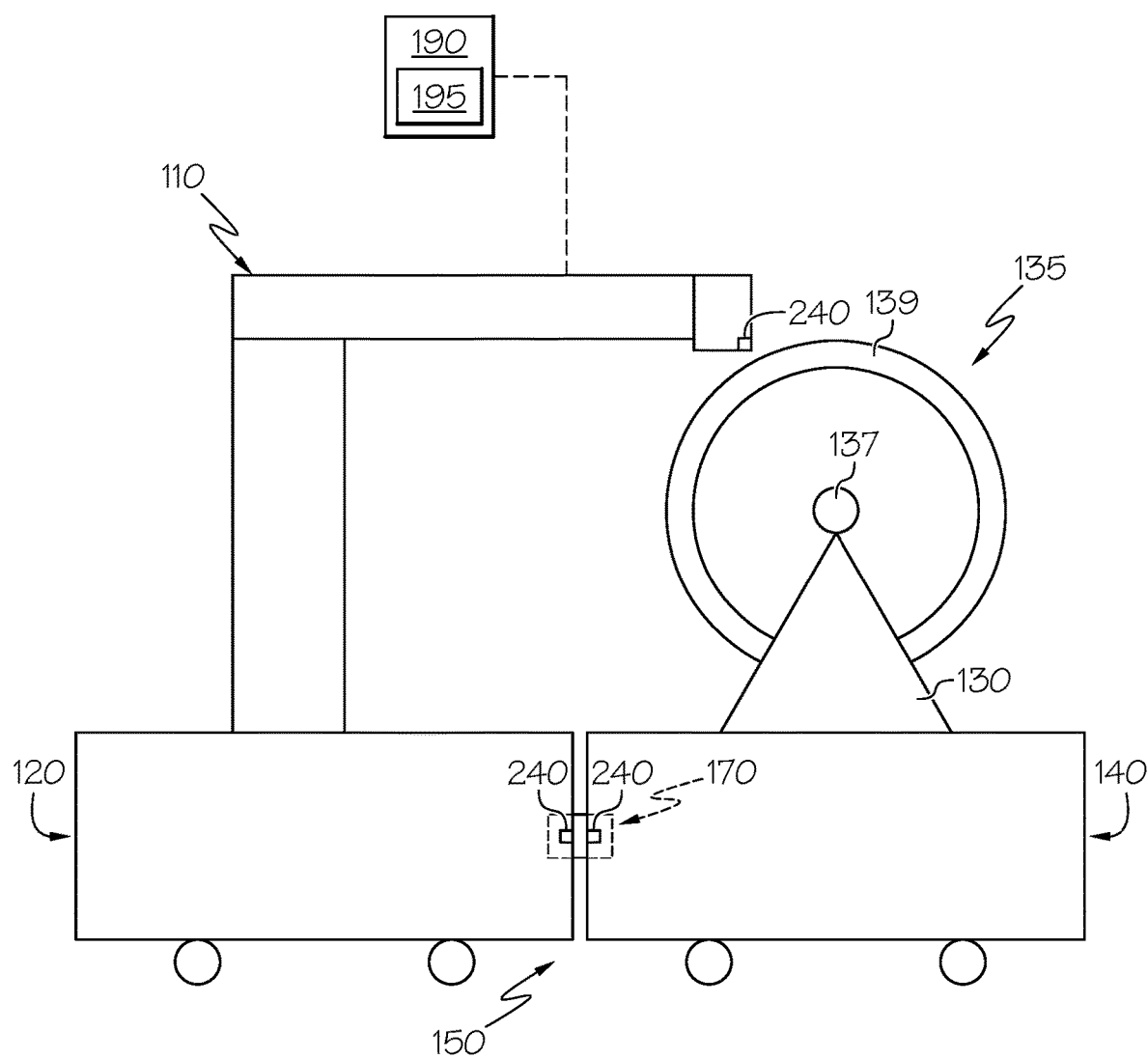
FIG. 2 is a section cut side view of an apparatus that can be used with the manufacturing system shown in FIG. 1.

FIG. 2 illustrates an exemplary embodiment of a coupled system 150. The first mobile platform 120 and the second mobile platform 140 are configured to couple together and move as a coupled system 150, see FIG. 1, along the production line 160. In one or more examples, at least one coupling feature 170 may be used to couple the first mobile platform 120 with the second mobile platform 140 to form a coupled system 150. Any suitable means of coupling the platforms to each other may be implemented and utilized, some examples of which are described below and illustrated in the figures.

Figure 3:
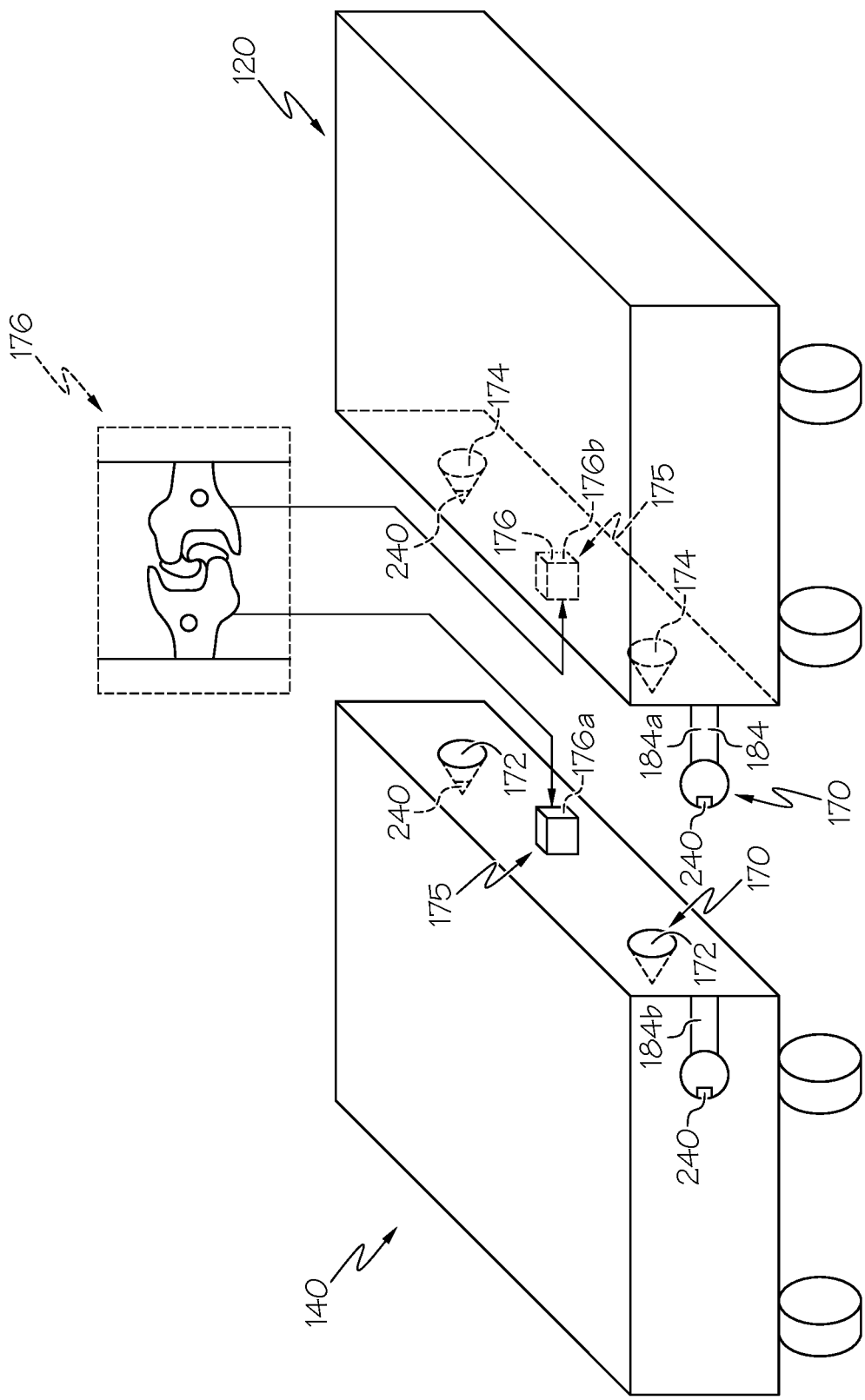
FIG. 3 is a perspective view of a first mobile platform and a second mobile platform that can be used with the manufacturing system shown in FIG. 1.

Referring to FIGS. 3, 4, 5, 6, 7 and 8, in one or more examples, one or more means of coupling the first mobile platform 120 with the second mobile platform 140 via a coupling feature 170 to form a coupled system 150 may be implemented and utilized. FIG. 3 illustrates the use of four coupling features 170, however one, two, three, or more coupling features 170 are contemplated and may be used in the manufacturing system 200. One or more sensors 240 may be included among the coupling features 170. A controller 190 may be configured to receive and analyze data collected from the one or more sensors 240. The controller 190 may further utilize the data received from the one or more sensors in conjunction with one or more numerical control programs 290 to facilitate coupling and movement of the first mobile platform 120 and second mobile platform 140.

FIG. 3 illustrates a cup 172 and cone 174. In one example, the coupling feature 170 includes a cup 172 and a cone 174. The cup 172 and cone 174 may be affixed to either the first mobile platform 120 or the second mobile platform 140 and configured to nest together and join the first mobile platform 120 with the second mobile platform 140. In an example, cup 172 is a female shape and cone 174 is a male complementary shape to nest within the other. The cup 172 and cone 174 are shown in a generally conic shape, however, other shapes are contemplated. In an example, a cup 172 may be located on each of first mobile platform 120 and second mobile platform 140 and a complimentary cone 174 may be located on each opposing first mobile platform 120 and second mobile platform 140, respectively. In one example, the cup 172 may be located on the first mobile platform 120 and the cone 174 may be located on the second mobile platform 140. In one example, the cup 172 may be located on the second mobile platform 140 and the cone may be located on the first mobile platform 120. Cup 172 and cone 174 may couple manually via an operator 330 or couple automatically via instructions from a controller 190. In an example, cup 172 and cone 174 may be configured such that one or both may project from a retracted position within first mobile platform 120 and second mobile platform 140, respectfully, and engage with each other. In an example, cup 172 and cone 174 may be configured such that one or both may extend from first mobile platform 120 and second mobile platform 140, respectively, and engage with each other upon proper alignment. Coupling feature 170 may include one or more sensors 240 to facilitate proper alignment of cup 172 with cone 174. A controller 190 may receive data collected from the one or more sensors 240 and utilize that data to control movement of the first mobile platform 120 and the second mobile platform 140 such that the cup 172 and cone 174 may couple and uncouple based upon instructions from one or more numerical control programs 290. In an example, controller 190 may use data collected from one or more sensors 240 in a feedback control loop to guide the alignment of cup 172 and cone 174.

FIG. 3 illustrates a hitch 184. In one or more examples, the coupling feature 170 includes a hitch 184. Hitch 184 may include a first hitch portion 184a and a second hitch portion 184b. First hitch portion 184a may be located on either the first mobile platform 120 or the second mobile platform 140 and have a ball hitch configuration that is retractable. Second hitch portion 184b may be located on the opposing mobile platform from which the first hitch portion 184a is located and may have a complimentary dome shape to the ball hitch configuration of first hitch portion 184a, such as a coupler configuration. First hitch portion 184a and second hitch portion 184b may be configured to nest or join in any suitable means to couple the first mobile platform 120 with the second mobile platform 140 to form a coupled system 150. First hitch portion 184a and second hitch portion 184b may couple manually via an operator 330, FIG. 10, or couple automatically via instructions from a controller 190. In an example, first hitch portion 184a and second hitch portion 184b may be configured such that one or both may project from a retracted or hinged position within first mobile platform 120 and second mobile platform 140, respectfully, and engage with each other. In an example, first hitch portion 184a and second hitch portion 184b may be configured such that one or both may extend from first mobile platform 120 and second mobile platform 140, respectively, and engage or nest with each other upon proper alignment. Coupling feature 170 may include one or more sensors 240 to facilitate proper alignment of the first hitch portion 184a and second hitch portion 184b. A controller 190 may receive data collected from the one or more sensors 240 and utilize that data to control movement of the first mobile platform 120 and the second mobile platform 140 such that the first hitch portion 184a and second hitch portion 184b may couple and uncouple based upon instructions from one or more numerical control programs 290. In an example, controller 190 may use data collected from one or more sensors 240 in a feedback control loop to guide the alignment of first hitch portion 184a and second hitch portion 184b.

FIG. 3 illustrates a trailer coupler 176. In one or more examples, the coupling feature 170 includes a trailer coupler 176. Trailer coupler 176 may include a first coupler portion 176a and a second coupler portion 176b. First coupler portion 176a may be located on either the first mobile platform 120 or the second mobile platform 140. Second coupler portion 176b may be located on the opposing mobile platform from which the first coupler portion 176a is located. First coupler portion 176a and second coupler portion 176b may be generally "c" shaped and may be configured to nest or join via any suitable means to couple the first mobile platform 120 with the second mobile platform 140 to form a coupled system 150. First coupler portion 176a and second coupler portion 176b may couple manually via an operator 330 or couple automatically via instructions from a controller 190. Trailer coupler 176 may include one or more sensors 240 to facilitate proper alignment of first coupler portion 176a with second coupler portion 176b. In an example, first coupler portion 176a and second coupler portion 176b may be configured such that one or both may project from a retracted or hinged position within first mobile platform 120 and second mobile platform 140, respectfully, and engage with each other. In an example, first coupler portion 176a and second coupler portion 176b may be configured such that one or both may extend from first mobile platform 120 and second mobile platform 140, respectively, and engage with each other upon proper alignment. A controller 190 may receive data collected from the one or more sensors 240 and utilize that data to control movement of the first mobile platform 120 and the second mobile platform 140 such that the first coupler portion 176a and the second coupler portion 176b may couple and uncouple based upon instructions from one or more numerical control programs 290. In an example, controller 190 may use data collected from one or more sensors 240 in a feedback control loop to guide the alignment of first coupler portion 176a and the second coupler portion 176b.

Figure 4:
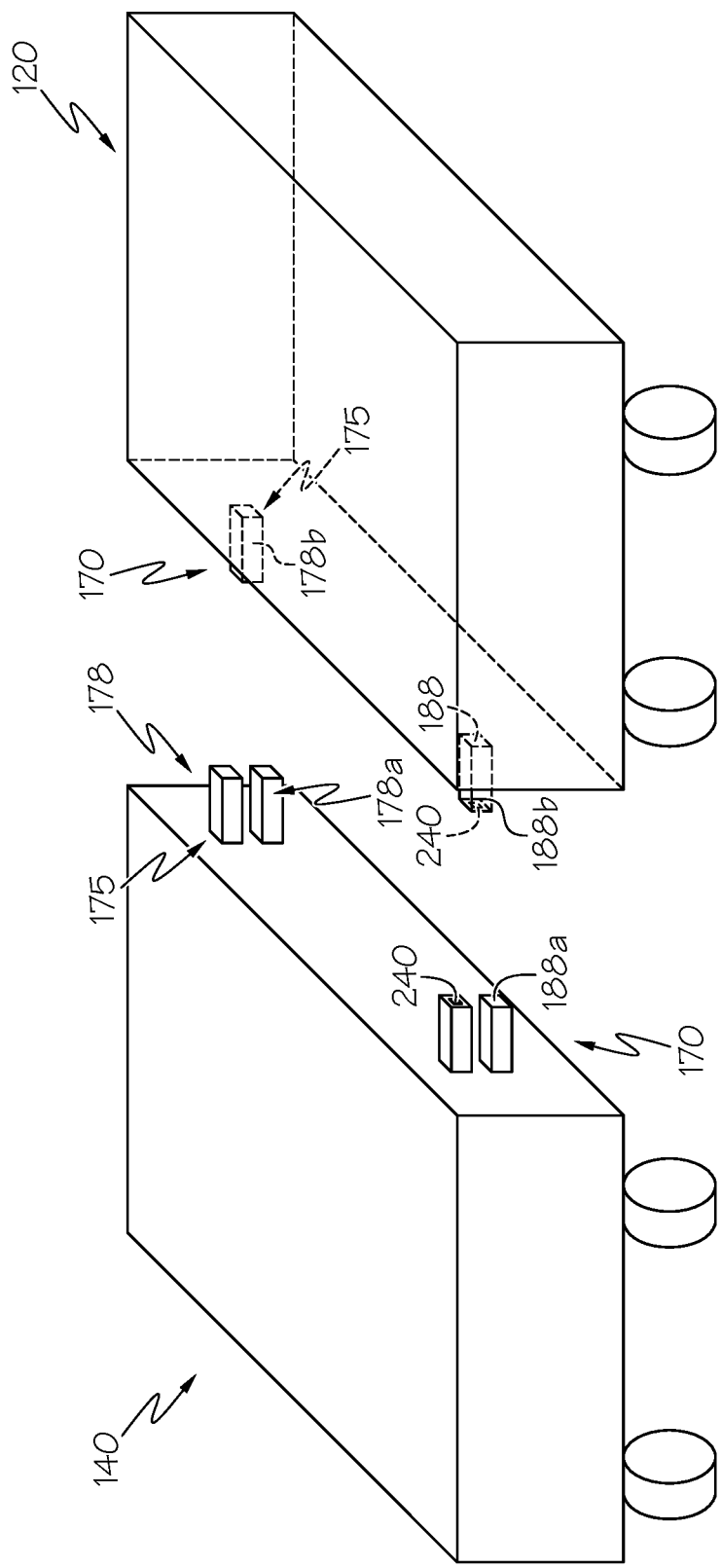
FIG. 4 is a perspective view of a first mobile platform and a second mobile platform that can be used with the manufacturing system shown in FIG. 1.

FIG. 4 illustrates the use of two coupling features 170. In one or more examples, the coupling feature 170 includes a latch 188. Latch 188 may include a first latch portion 188a and a second latch portion 188b. First latch portion 188a may be located on either the first mobile platform 120 or the second mobile platform 140. Second latch portion 188b may be located on the opposing mobile platform from which first latch portion 188a is located. First latch portion 188a and second latch portion 188b may be configured to nest or join via any suitable means to couple the first mobile platform 120 with the second mobile platform 140. First latch portion 188a and second latch portion 188b may couple manually via an operator 330 or couple automatically via instructions from a controller 190. Latch 188 may further include one or more sensors 240 to facilitate proper alignment of first latch portion 188a with second latch portion 188b. In an example, latch portion 188a and second latch portion 188b may be configured such that one or both may project from a retracted or hinged position within first mobile platform 120 and second mobile platform 140, respectfully, and engage with each other. In an example, first latch portion 188a and second latch portion 188b may be configured such that one or both may extend from first mobile platform 120 and second mobile platform 140, respectively, and engage with each other upon proper alignment. A controller 190 may receive data collected from the one or more sensors 240 and utilize that data to control movement of the first mobile platform 120 and the second mobile platform 140 such that the first latch portion 188a and second latch portion 188b may couple and uncouple based upon instructions from one or more numerical control programs 290. In an example, controller 190 may use data collected from one or more sensors 240 in a feedback control loop to guide the alignment of first latch portion 188a and second latch portion 188b.

Figure 5B:
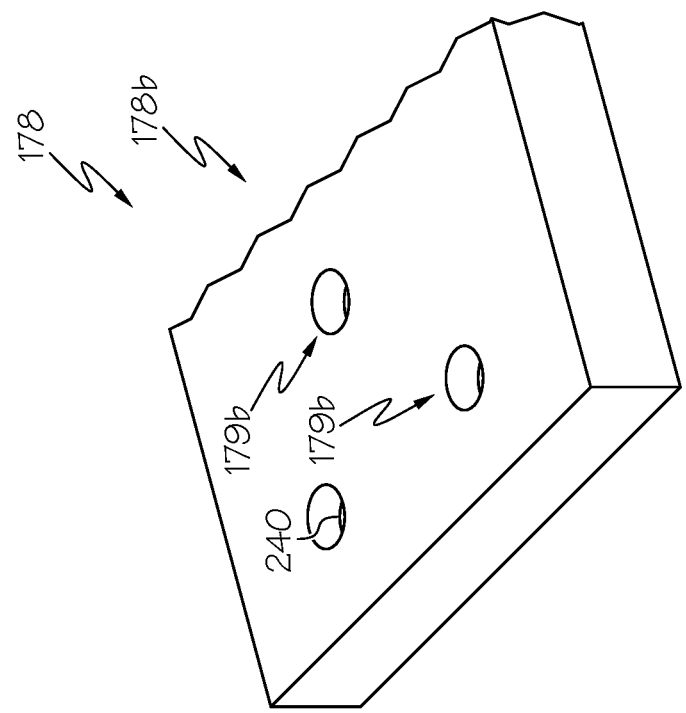
FIGS. 5A and 5B are perspective views of a first mobile platform and a second mobile platform that can be used with the manufacturing system shown in FIG. 1.
Figure 5A:
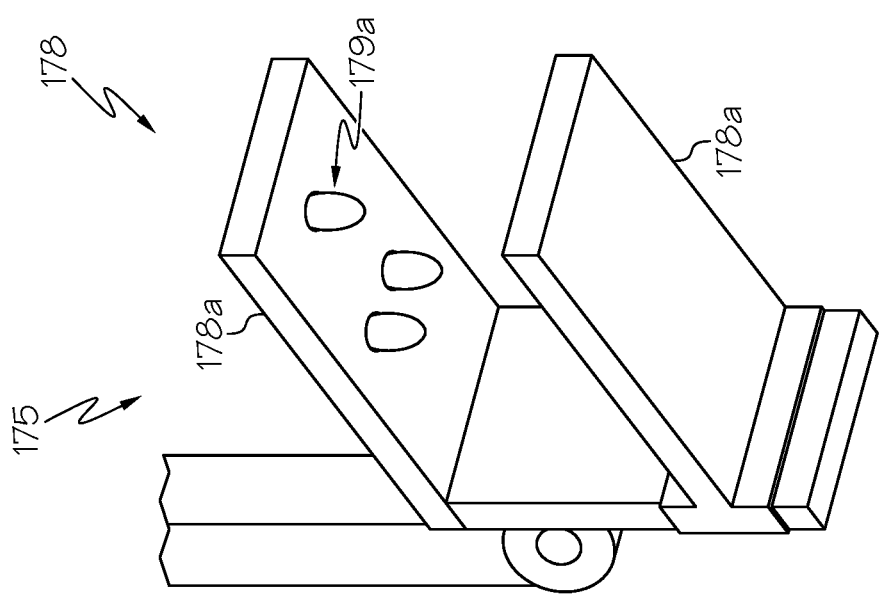

In one or more examples, as illustrated in FIG. 4, the coupling feature 170 includes a gripper 178. Gripper 178 may include a gripping portion 178a and an indexing portion 178b. Gripping portion 178a may be located on either the first mobile platform 120 or the second mobile platform 140 and may include one or more indexing structures 179a. In an example, gripping portion 178a may be configured to slide in order to engage with indexing portion 178b. In an example, indexing portion 178b may be configured to slide up to gripping portion 178a to engage or sandwich the two together. In an example, the one or more indexing structure 179a may have interlocking cantilevered structure configurations. Indexing portion 178b may be located on the opposing mobile platform from which gripping portion 178a is located and may include one or more interfacing structures 179b. As illustrated in FIGS. 5A and 5B, indexing structure 179a may be configured to align and nest with interfacing structures 179b to couple first mobile platform 120 with second mobile platform 140. Interfacing structures 179b may be in a pin configuration so as to interlock with indexing structure 179a, which may have a hole or slot configuration. Gripping portion 178a and the indexing portion 178b may couple manually via an operator 330 or couple automatically via instructions from a controller 190 by, for example, sliding into place such that indexing portion 178b is sandwiched within gripping portion 178a. Gripper 178 may further include one or more sensors 240 to facilitate proper alignment of indexing structure 179a and interfacing structure 179b when indexing portion 178b is sandwiched within gripping portion 178a. In an example, indexing structure 179a may be retractable such that it may extend from gripping portion 178a into interfacing structure 179b for alignment. A controller 190 may receive data collected from the one or more sensors 240 and utilize that data to control movement of the first mobile platform 120 and the second mobile platform 140 such that the gripping portion 178a and the indexing portion 178b may couple and uncouple based upon instructions from one or more numerical control programs 290. In an example, controller 190 may use data collected from one or more sensors 240 in a feedback control loop to guide the alignment of gripping portion 178a and the indexing portion 178b.

FIG. 6 illustrates the use of one coupling feature 170. In one or more examples, the coupling feature 170 includes a cam lock 186. Cam lock 186 may include a first locking portion 186a and a second locking portion 186b. First locking portion 186a may be located on either the first mobile platform 120 or the second mobile platform 140 and may have a cantilevered rectilinear structure in the form of a cam configuration. Second locking portion 186b may be located on the opposing mobile platform from which the first locking portion 186a is located and may have a base configuration to receive first locking portion 186a. The second locking portion 186b may be configured to lock the first locking portion 186a in place when rotated. First locking portion 186a and second locking portion 186b may be configured to connect or lock via any suitable means to couple the first mobile platform 120 with the second mobile platform 140. First locking portion 186a and second locking portion 186b may couple manually via an operator 330 or couple automatically via instructions from a controller 190. Cam lock 186 may further include one or more sensors 240 to facilitate proper alignment of first locking portion 186a with second locking portion 186b. A controller 190 may receive data collected from the one or more sensors 240 and utilize that data to control movement of the first mobile platform 120 and the second mobile platform 140 such that the first locking portion 186a and second locking portion 186b may couple and uncouple based upon instructions from one or more numerical control programs 290. In an example, controller 190 may use data collected from one or more sensors 240 in a feedback control loop to guide the alignment of first locking portion 186a and second locking portion 186b.

Figure 7:
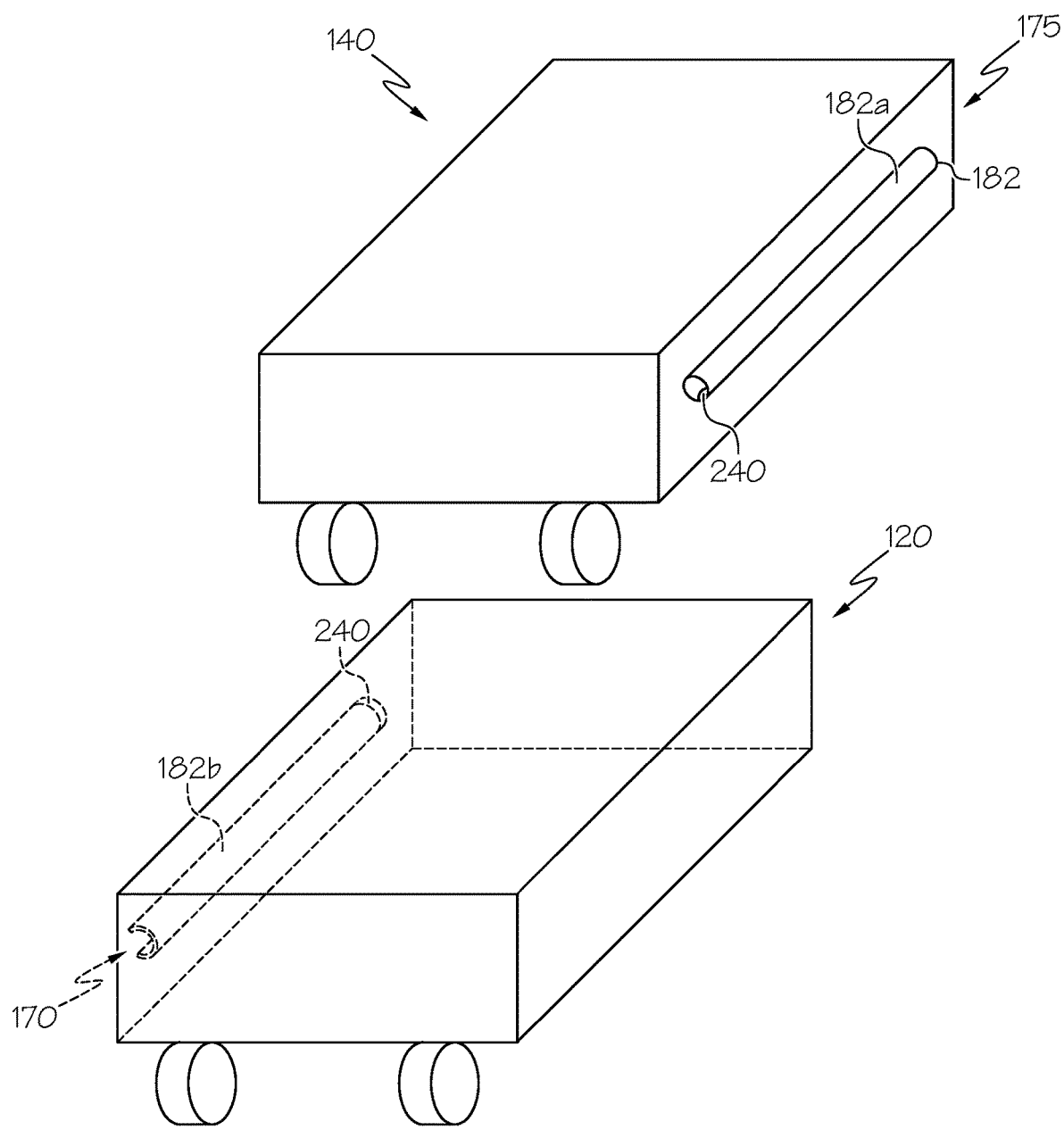
FIG. 7 is a perspective view of a first mobile platform and a second mobile platform that can be used with the manufacturing system shown in FIG. 1.

FIG. 7 illustrates the use of one coupling feature 170. In one or more examples, the coupling feature 170 includes a rail 182. Rail 182 may include a rail portion 182a and a receiving portion 182b. Rail portion 182a may be located on the first mobile platform 120 or the second mobile platform 140 and may be mounted as such via any suitable means of coupling including a cantilever or coupler mechanism (not shown). Receiving portion 182b may be located on the opposing mobile platform from which the rail portion 182a is located. The rail portion 182a and the receiving portion 182b may be configured to nest or join together via any suitable means to couple the first mobile platform 120 with the second mobile platform 140. In an example, the rail portion 182a may slide into and along the receiving portion 182b to nest together. The rail portion 182a and the receiving portion 182b may couple manually via an operator 330 or couple automatically via instructions from a controller 190. Rail 182 may further include one or more sensors 240 to facilitate proper alignment of rail portion 182a with receiving portion 182b. A controller 190 may receive data collected from the one or more sensors 240 and utilize that data to control movement of the first mobile platform 120 and the second mobile platform 140 such that the rail portion 182a and the receiving portion 182b may couple and uncouple based upon instructions from one or more numerical control programs 290. In an example, the controller 190 may utilize the data collected from the one or more sensors 240 in a feedback control loop to guide the alignment of rail portion 182a into receiving portion 182b.

Figure 11:
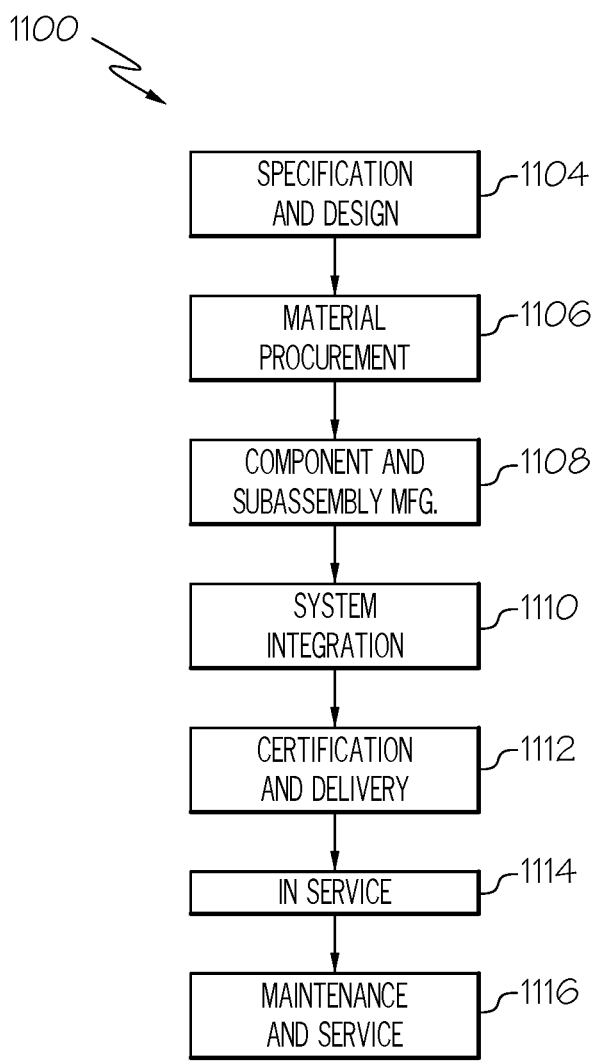
FIG. 11 is a flow diagram of an aircraft manufacturing and service methodology.

Referring to FIGS. 1, 2, and 11, in one or more examples, the manufacturing system 200 includes an automated machine 110 mounted on the first mobile platform 120. The automated machine 110 is configured to perform at least one manufacturing operation 210. In one or more examples, the automated machine 110 may be an automated fiber placement machine configured to deposit composite material 139. In one or more examples, the manufacturing system 200 includes a tool 130 is mounted on the second mobile platform 140. In an example, second mobile platform 140 carries a workpiece 135 while first mobile platform 120 carries an automated machine 110 configured to perform work upon the workpieces 135 of second mobile platform 140. The tool 130, illustrated in FIG. 2, may include a mandrel 137 configured to hold workpiece 135. The automated machine 110 may be configured to deposit composite material 139, onto the workpiece 135 that may be located on a tool 130.

In one or more examples, the manufacturing system 200 includes an indexing feature 175. The indexing feature 175 may be configured to index the automated machine 110 relative to the tool 130 or workpiece 135. The indexing feature 175 may include one or more of a gripper 178, a latch 188, a cup 172 and a cone 174, a hitch 184, a cam lock 186, a rail 182, and a trailer coupler 176. In one or more examples, the indexing feature 175 and coupling feature 170 are the same. In one or more examples, the coupled system 150 of manufacturing system 200 includes a combination of indexing features 175 and coupling features 170. A controller 190 may be configured to dictate indexing and coupling of any manufactured workpiece 135 of any layup configuration including but not limited to a barrel section, a wing panel, a wing panel, fuselage, and any combination thereof continuously moving along production line 160 in any order. For example, the manufacturing system 200 may support the manufacturing of a wing panel as it travels along production line 160 followed by a barrel section travelling behind the wing along the production line 160.

FIG. 4 illustrates a gripper 178. In one or more examples, indexing feature 175 includes a gripper 178. Gripper 178 may include a gripping portion 178a and an indexing portion 178b. Gripping portion 178a may be located on either the first mobile platform 120 or the second mobile platform 140 and may include one or more indexing structures 179a as illustrated in FIG. 5A. Indexing portion 178b may be located on the opposing mobile platform from which gripping portion 178a is located and may include one or more interfacing structures 179b. Indexing structure 179a may be configured to align and nest with interfacing structures 179b to index automated machine 110 relative to the tool 130 as illustrated in FIG. 5B. Indexing may occur manually via an operator 330 or automatically via instructions from a controller 190. In an example, controller 190 may use data collected from one or more sensors 240 in a feedback control loop to guide the alignment of 178a and 178b.

FIG. 4 illustrates a latch 188. In one or more examples, indexing feature 175 includes a latch 188. Latch 188 may include a first latch portion 188a and a second latch portion 188b. First latch portion 188a may be located on either the first mobile platform 120 or the second mobile platform 140. Second latch portion 188b may be located on the opposing mobile platform from which first latch portion 188a is located. First latch portion 188a and second latch portion 188b may be configured to nest or join via any suitable means to index the automated machine 110 relative to the tool 130. Indexing may occur manually via an operator 330 or automatically via instructions from a controller 190. In an example, controller 190 may use data collected from one or more sensors 240 in a feedback control loop to guide the alignment of 188a and 188b.

FIG. 3 illustrates a cup 172 and cone 174. In one or more examples, indexing feature 175 includes cup a 172 and a cone 174. The cup 172 and cone 174 may be affixed to either the first mobile platform 120 or the second mobile platform 140 and configured to nest together to index the automated machine 110 relative to the tool 130. In one example, the cup 172 may be located on the first mobile platform 120 and the cone 174 may be located on the second mobile platform 140. In one example, the cup 172 may be located on the second mobile platform 140 and the cone may be located on the first mobile platform 120. Cup 172 and cone 174 may index manually via an operator 330 or index automatically via instructions from a controller 190. In an example, controller 190 may use data collected from one or more sensors 240 in a feedback control loop to guide the alignment of cup 172 and cone 174.

FIG. 3 illustrates a hitch 184. In one or more examples, indexing feature 175 includes a hitch 184. Hitch 184 may include a first hitch portion 184a and a second hitch portion 184b. First hitch portion 184a may be located on either the first mobile platform 120 or the second mobile platform 140. Second hitch portion 184b may be located on the opposing mobile platform from which the first hitch portion 184a is located. First hitch portion 184a and second hitch portion 184b may be configured to nest or join in any suitable means to index the automated machine 110 relative to the tool 130. First hitch portion 184a and second hitch portion 184b may index manually via an operator 330 or index automatically via instructions from a controller 190. In an example, controller 190 may use data collected from one or more sensors 240 in a feedback control loop to guide the alignment of first hitch portion 184a and second hitch portion 184b.

FIG. 6 illustrates a cam lock 186. In one or more examples, indexing feature 175 includes a cam lock 186. Cam lock 186 may include a first locking portion 186a and a second locking portion 186b. First locking portion 186a may be located on either the first mobile platform 120 or the second mobile platform 140. Second locking portion 186b may be located on the opposing mobile platform from which the first locking portion 186a is located. First locking portion 186a and second locking portion 186b may be configured to connect or lock via any suitable means to index the automated machine 110 relative to the tool 130. First locking portion 186a and second locking portion 186b may index manually via an operator 330 or index automatically via instructions from a controller 190. In an example, controller 190 may use data collected from one or more sensors 240 in a feedback control loop to guide the alignment of first locking portion 186a and second locking portion 186b.

FIG. 7 illustrates a rail. In one or more examples, indexing feature 175 includes a rail 182. Rail 182 may include a rail portion 182a and a receiving portion 182b. Rail portion 182a may be located on the first mobile platform 120 or the second mobile platform 140. Receiving portion 182b may be located on the opposing mobile platform from which the rail portion 182a is located. The rail portion 182a and the receiving portion 182b may be configured to nest or join together via any suitable means to index the automated machine 110 relative to the tool 130. The rail portion 182a and the receiving portion 182b may index manually via an operator 330 or index automatically via instructions from a controller 190. In an example, controller 190 may use data collected from one or more sensors 240 in a feedback control loop to guide the alignment of rail portion 182a and the receiving portion 182b.

FIG. 3 illustrates a trailer coupler. In one or more examples, indexing feature 175 includes a trailer coupler 176. Trailer coupler 176 may include a first coupler portion 176a and a second coupler portion 176b. First coupler portion 176a may be located on either the first mobile platform 120 or the second mobile platform 140. Second coupler portion 176b may be located on the opposing mobile platform from which the first coupler portion 176a is located. First coupler portion 176a and second coupler portion 176b may be configured to nest or join via any suitable means to index the automated machine 110 relative to the tool 130. First coupler portion 176a and second coupler portion 176b may index manually via an operator 330 or index automatically via instructions from a controller 190. In an example, controller 190 may use data collected from one or more sensors 240 in a feedback control loop to guide the alignment of first coupler portion 176a and second coupler portion 176b.

In one or more examples, the tool 130 may include one or more sensors 240. The sensors 240 may be configured to facilitate indexing of the automated machine 110 with the tool 130 based upon a command 250 received from a controller 190. The controller 190 may analyze data received from the one or more sensors 240 and dictate movement of the first mobile platform 120 and the second mobile platform 140 based upon one or more numerical control programs 290.

In an example, the automated machine 110 may include one or more sensors 240. The sensors 240 may be configured to facilitate indexing of the automated machine 110 relative to a tool 130 based upon a command 250 received from a controller 190. The controller 190 may analyze data received from the one or more sensors 240 and dictate movement of the first mobile platform 120 and the second mobile platform 140 based upon one or more numerical control programs 290. In an example, the one or more sensors 240 may include a barcode, RDIF tags with associated readers, optical sensors, or any other means suitable of collecting data regarding the position and location of at least a workpiece 135, tool 130, automated machine 110, coupling feature 170, indexing feature 175, and anything located along production line 160.

In one or more examples, the indexing feature 175 and coupling feature 170 are the same. Indexing and coupling may occur simultaneously. In one or more examples, the manufacturing system 200 may include more than one indexing feature 175 and more than one coupling feature 170 such that some are the same and some are different. In an example, coupling feature 170 may be useful in joining first mobile platform 120 with second mobile platform 140 and indexing feature 175 may be useful in aligning such that composite material 139 is transferred accurately to each workpiece 135.

In one or more examples, the manufacturing system 200 may be configured such that the automated machine 110 performs the at least one manufacturing operation 210 while the coupled system 150 travels along the production line 160. In an example, the coupled system 150 may travel continuously along the production line 160 while the automated machine 110 performs the at least one manufacturing operation 210. In an example, illustrated in FIG. 2, the at least one manufacturing operation 210 includes depositing composite material 139. A controller 190 may determine the parameters of the at least one manufacturing operation 210, including at least the type of operation performed, the amount of composite material 139 to deposit, the location on the tool 130 in which the composite material 139 is deposited, the length of time composite material 139 is to be deposited, and other parameters. First mobile platform 120 and second mobile platform 140 may be configured in any size or shape necessary for a specific workpiece 135 and automated machine 110, respectively. The disclosed manufacturing system 200 provides a type of hitchhiker arrangement where both tooling and techniques are coupled to the structure currently being worked upon and advance, at a slow rate, with the structure while performing at least one manufacturing operation 210 upon it. The coupled system 150 is then configured to uncouple downstream and then return or recycle back to a point to couple or hitchhike with another tool on a second mobile platform 140.

Figure 8:
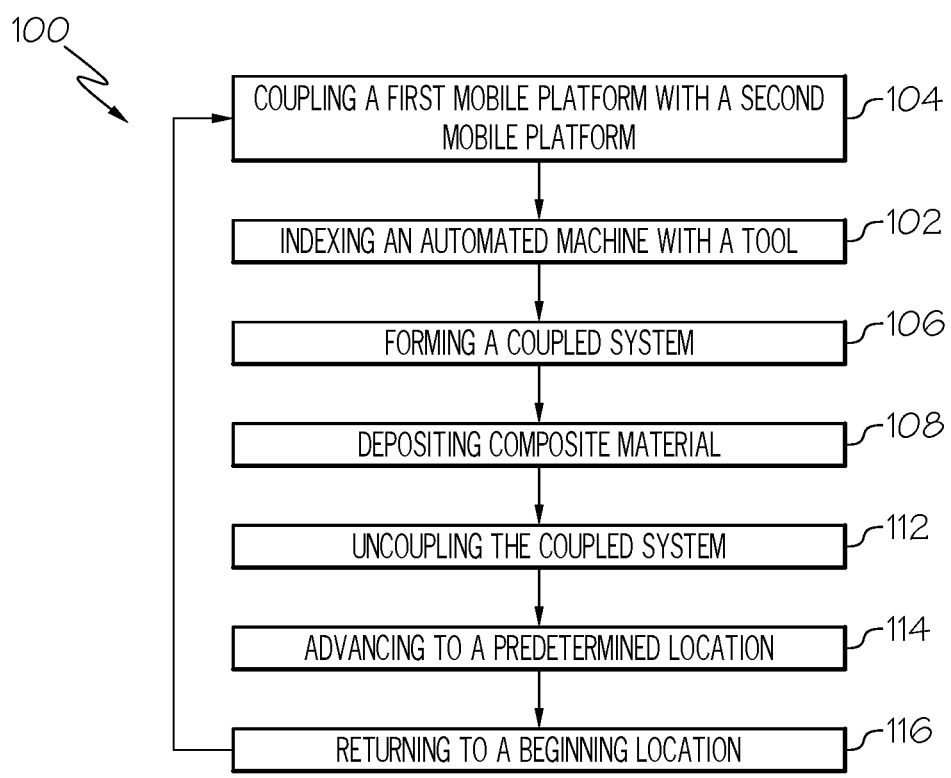
FIG. 8 is a flowchart illustrating a method for depositing composite material onto a tool as shown in FIGS. 1 and 2.

Referring to FIG. 8, in one or more examples, a method 100 for depositing composite material 139 onto a tool 130 is disclosed. The method 100 may include using at least one automated machine 110 to deposit the composite material 139 onto the tool 130. In one or more examples, the automated machine is an automated fiber placement machine.

In one or more examples, the method 100 includes coupling 104 a first mobile platform 120 with a second mobile platform 140 as shown and described above and in the figures. Coupling may occur manually via an operator 330 or automatically via a command 250 received from a controller 190. The controller 190 may utilize one or more numerical control programs 290 to determine when and how coupling occurs. Any means suitable for coupling the first mobile platform 120 with the second mobile platform 140 may be utilized. Examples shown and described above and in the figures include using one or more coupling features 170 that may include one or more of a gripper 178, a latch 188, a cup 172 and a cone 174, a hitch 184, a cam lock 186, a rail 182, and a trailer coupler 176. In an example, coupling 104 is utilized to join first mobile platform 120 with second mobile platform 140.

In an example, coupling feature 170 may include a gripper 178. Gripper 178 may include a gripping portion 178a and an indexing portion 178b. Gripping portion 178a may be located on either the first mobile platform 120 or the second mobile platform 140 and may include one or more indexing structure 179a. Indexing portion 178b may be located on the opposing mobile platform from which gripping portion 178a is located and may include one or more interfacing structures 179b. Indexing structure 179a may be configured to align and nest with interfacing structures 179b to couple first mobile platform 120 with second mobile platform 140 and achieve coupling 104. Gripping portion 178a and the indexing portion 178b may couple manually via an operator 330 or couple automatically via instructions from a controller 190. Gripper 178 may further include one or more sensors 240 to facilitate proper alignment of indexing structure 179a and interfacing structure 179b. A controller 190 may receive data collected from the one or more sensors 240 and utilize that data to control movement of the first mobile platform 120 and the second mobile platform 140 such that the gripping portion 178a and the indexing portion 178b may couple and uncouple based upon instructions from one or more numerical control programs 290.

In an example, coupling feature 170 may include a latch 188. Latch 188 may include a first latch portion 188a and a second latch portion 188b. First latch portion 188a may be located on either the first mobile platform 120 or the second mobile platform 140. Second latch portion 188b may be located on the opposing mobile platform from which first latch portion 188a is located. First latch portion 188a and second latch portion 188b may be configured to nest or join via any suitable means to couple the first mobile platform 120 with the second mobile platform 140 and achieve coupling 104. First latch portion 188a and second latch portion 188b may couple manually via an operator 330 or couple automatically via instructions from a controller 190. Latch 188 may further include one or more sensors 240 to facilitate proper alignment of first latch portion 188a with second latch portion 188b. A controller 190 may receive data collected from the one or more sensors 240 and utilize that data to control movement of the first mobile platform 120 and the second mobile platform 140 such that the first latch portion 188a and second latch portion 188b may couple and uncouple based upon instructions from one or more numerical control programs 290.

FIG. 3 illustrates a cup 172 and cone 174. In an example, coupling feature 170 may include a cup 172 and a cone 174. The cup 172 and cone 174 may be affixed to either the first mobile platform 120 or the second mobile platform 140 and configured to nest together and join the first mobile platform 120 with the second mobile platform 140. In one example, the cup 172 may be located on the first mobile platform 120 and the cone 174 may be located on the second mobile platform 140 to achieve coupling 104. In one example, the cup 172 may be located on the second mobile platform 140 and the cone may be located on the first mobile platform 120. Cup 172 and cone 174 may couple manually via an operator 330 or couple automatically via instructions from a controller 190. Coupling feature 170 may include one or more sensors 240 to facilitate proper alignment of cup 172 with cone 174. A controller 190 may receive data collected from the one or more sensors 240 and utilize that data to control movement of the first mobile platform 120 and the second mobile platform 140 such that the cup 172 and cone 174 may couple and uncouple based upon instructions from one or more numerical control programs 290.

FIG. 3 illustrates a hitch 184. In an example, coupling feature 170 may include a hitch 184. Hitch 184 may include a first hitch portion 184a and a second hitch portion 184b. First hitch portion 184a may be located on either the first mobile platform 120 or the second mobile platform 140. Second hitch portion 184b may be located on the opposing mobile platform from which the first hitch portion 184a is located. First hitch portion 184a and second hitch portion 184b may be configured to nest or join in any suitable means to couple the first mobile platform 120 with the second mobile platform 140 to form 106 a coupled system 150 and achieve coupling 104. First hitch portion 184a and second hitch portion 184b may couple manually via an operator 330 or couple automatically via instructions from a controller 190. Coupling feature 170 may include one or more sensors 240 to facilitate proper alignment of the first hitch portion 184a and second hitch portion 184b. A controller 190 may receive data collected from the one or more sensors 240 and utilize that data to control movement of the first mobile platform 120 and the second mobile platform 140 such that the first hitch portion 184a and second hitch portion 184b may couple and uncouple based upon instructions from one or more numerical control programs 290.

FIG. 6 illustrates a cam lock 186. In an example, coupling feature 170 may include a cam lock 186. Cam lock 186 may include a first locking portion 186a and a second locking portion 186b. First locking portion 186a may be located on either the first mobile platform 120 or the second mobile platform 140. Second locking portion 186b may be located on the opposing mobile platform from which the first locking portion 186a is located. First locking portion 186a and second locking portion 186b may be configured to connect or lock via any suitable means to couple the first mobile platform 120 with the second mobile platform 140 and achieve coupling 104. First locking portion 186a and second locking portion 186b may couple manually via an operator 330 or couple automatically via instructions from a controller 190. Cam lock 186 may further include one or more sensors 240 to facilitate proper alignment of first locking portion 186a with second locking portion 186b. A controller 190 may receive data collected from the one or more sensors 240 and utilize that data to control movement of the first mobile platform 120 and the second mobile platform 140 such that the first locking portion 186a and second locking portion 186b may couple and uncouple based upon instructions from one or more numerical control programs 290.

FIG. 7 illustrates a rail 182. In an example, coupling feature 170 may include a rail 182. Rail 182 may include a rail portion 182a and a receiving portion 182b. Rail portion 182a may be located on the first mobile platform 120 or the second mobile platform 140. Receiving portion 182b may be located on the opposing mobile platform from which the rail portion 182a is located. The rail portion 182a and the receiving portion 182b may be configured to nest or join together via any suitable means to couple the first mobile platform 120 with the second mobile platform 140 and achieve coupling 104. The rail portion 182a and the receiving portion 182b may couple manually via an operator 330 or couple automatically via instructions from a controller 190. Rail 182 may further include one or more sensors 240 to facilitate proper alignment of rail portion 182a with receiving portion 182b. A controller 190 may receive data collected from the one or more sensors 240 and utilize that data to control movement of the first mobile platform 120 and the second mobile platform 140 such that the rail portion 182a and the receiving portion 182b may couple and uncouple based upon instructions from one or more numerical control programs 290.

FIG. 3 illustrates a trailer coupler 176. In an example, coupling feature 170 may include a trailer coupler 176. Trailer coupler 176 may include a first coupler portion 176a and a second coupler portion 176b. First coupler portion 176a may be located on either the first mobile platform 120 or the second mobile platform 140. Second coupler portion 176b may be located on the opposing mobile platform from which the first coupler portion 176a is located. First coupler portion 176a and second coupler portion 176b may be configured to nest or join via any suitable means to couple the first mobile platform 120 with the second mobile platform 140 to achieve coupling 104 and form 106 a coupled system 150. First coupler portion 176a and second coupler portion 176b may couple manually via an operator 330 or couple automatically via instructions from a controller 190. Trailer coupler 176 may include one or more sensors 240 to facilitate proper alignment of first coupler portion 176a with second coupler portion 176b. A controller 190 may receive data collected from the one or more sensors 240 and utilize that data to control movement of the first mobile platform 120 and the second mobile platform 140 such that the first coupler portion 176a and the second coupler portion 176b may couple and uncouple based upon instructions from one or more numerical control programs 290.

Forming 106 a coupled system 150 may occur upon completion of the coupling 104. When the coupling 104 is completed. In one or more examples, the first mobile platform 120 of the coupled system 150 may support at least one automated machine 110. The second mobile platform may support a tool 130 or workpiece 135 independent of a tool 130.

In one or more examples, the method 100 includes indexing 102 the automated machine relative to the tool 130 to provide accurate alignment of the automated machine 110 relative to the tool 130 prior to transferring or depositing composite material 139. Indexing 102 may be achieved by any suitable means including use of at least one indexing feature 175. Once the coupled system 150 is formed, indexing 102 may be utilized to fine tune alignment of a workpiece 135 with an automated machine 110 for proper composite material 139 transfer and workpiece 135 layup. In one or more examples, indexing 102 may be achieved using one or more sensors 240. In an example, indexing 102 and coupling 104 may occur simultaneously. In an example, indexing 102 and coupling 104 may be achieved by the same means such that indexing feature 175 and coupling feature 170 are the same feature and simultaneously achieve creation of a coupled system 150 and alignment of a workpiece 135 with an automated machine 110. In one or more examples, indexing 102 may be achieved using at least one indexing feature 175 and at least one sensor 240. In an example, at least one sensor 240 may be located on one or more of the first mobile platform 120, second mobile platform 140, automated machine 110, and tool 130. Indexing feature 175 may include at least one of a gripper 178, a latch 188, a cup 172 and a cone 174, a hitch 184, a cam lock 186, a rail 182, and a trailer coupler 176. In an example, any of the above-mentioned means of coupling may be used in conjunction with any of the above-mentioned means of indexing via the same means or different means.

In one or more examples, indexing 102 of the automated machine 110 with the tool 130 includes receiving a command 250. In an example, the command 250 may come from a controller 190. Controller 190 may be in communication with one or more of the indexing features 175, coupling features 170, automated machine 110, first mobile platform 120, and second mobile platform 140. Controller 190 may utilize one or more global positioning systems (GPS) 220, sensors 240, lasers 230, numerical control programs 290, barcode 197, or any other suitable means of determining proper alignment of the automated machine 110 relative to the tool 130. In other words, travel of the first mobile platform (120) and the second mobile platform (140) may be controlled by a global positioning systems (GPS) 220, sensors 240, lasers 230, numerical control programs 290, barcode 197, or the like. In an example, the command 250 may be transmitted wirelessly.

In one or more examples, the method 100 may include depositing 108 composite material 139 from the automated machine 110 onto the tool 130. Depositing 108 may occur while the coupled system 150 is traveling along a production line 160. In one or more examples, the coupled system 150 may continuously move along the production line 160. The coupled system 150 may be driven by the second mobile platform 140 along the production line 160 by a motion controller 195. In an example, the coupled system 150 may be driven by the first mobile platform 120 along the production line 160 by a motion controller 195 configured to direct and guide the coupled system 150 or either the first mobile platform 120 or second mobile platform 140 to a desired location. Motion controller 195 may utilize one or more sensors 240, numerical control programs 290, or any other input from controller 190 or an operator 330 to dictate In an example, the coupled system 150 may move in pulses along the production line 160.

Figure 14:
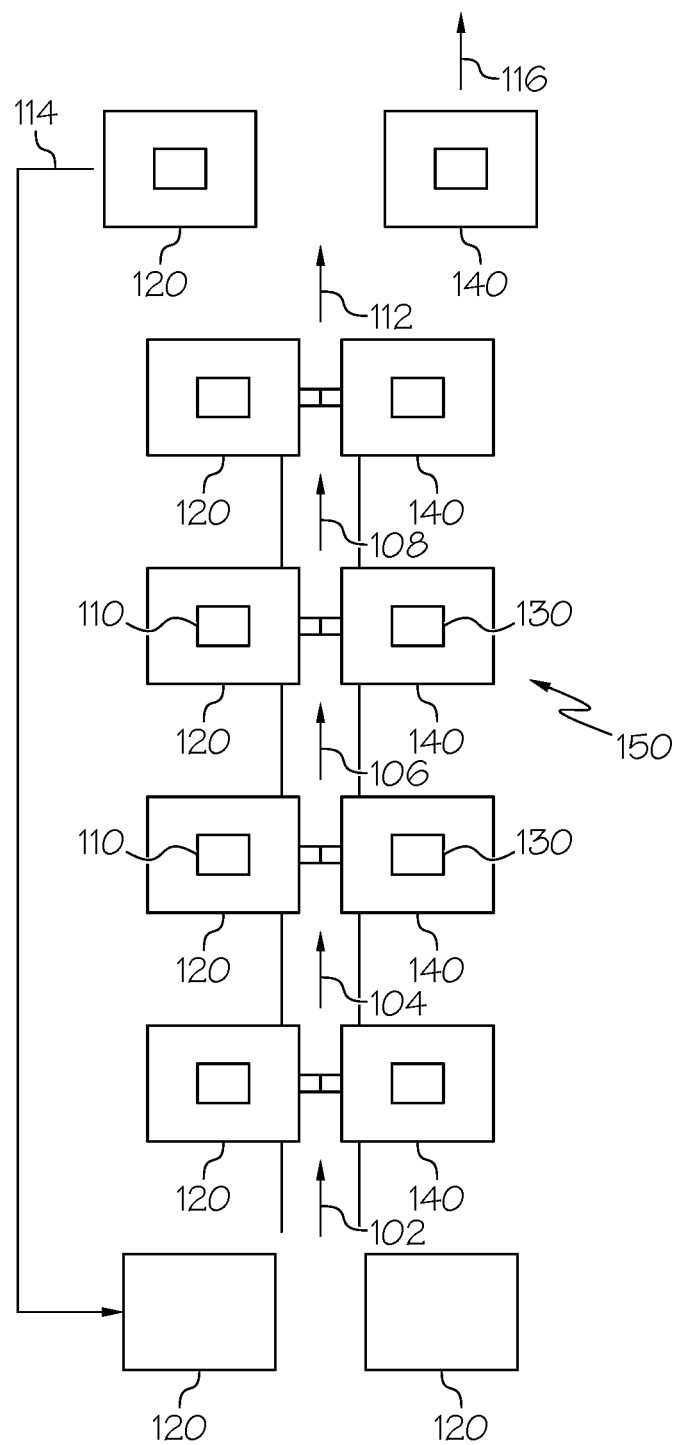
FIG. 14 is a plan view of a flow diagram of the method of FIG. 8.

In one or more examples, the method 100 may include uncoupling 112 of the coupled system 150. Uncoupling 112 may occur while the coupled system 150 continuously moves along the production line 160 or while the coupled system 150 moves in pulses along the production line 160. In an example, uncoupling 112 may occur in response to a command 250 transmitted from the controller 190. The controller may utilize data collected from one or more sensors 240 to determine when uncoupling 112 occurs. In an example, the controller 190 may utilize one or more numerical control programs 290 to determine when uncoupling 112 occurs. In an example, uncoupling 112 may occur manually by an operator 330. See FIG. 14.

In one or more examples, the method 100 further includes advancing 114 the second mobile platform 140 to a predetermined location 169 on the production line 160. Predetermined location 169 may be, in an example, an autoclave 260. The predetermined location 169 may be located at a subsequent station 400 along the production line 160. In an example, controller 190 may be configured to determine when advancing 114 occurs and where the predetermined location 169 is located. Controller 190 may further initiate the advancing 114 by transmitting a command 250. Controller 190 may determine when advancing occurs based upon data received from the one or more sensors 240. In an example, controller 190 may determine when advancing 114 occurs based upon one or more numerical control programs 290. In an example, advancing 114 occurs manually via an operator 330. See FIG. 14.

In one or more examples, the method 100 further includes returning 116 the first mobile platform 120 to a beginning location 165 along the production line 160. In an example, the first mobile platform 120 may be moved to a predetermined location 169. Once the first mobile platform 120 returns to the beginning location or is moved to a predetermined location 169, it may be configured to couple 104 with a different mobile platform for performing further manufacturing operations 210.

In one or more examples, the method 100 includes coupling 104 a third mobile platform 180 with the second mobile platform 140 to form a coupled system 150. Coupling 104 may occur via any combination of the coupling features 170 described above. In an example, the third mobile platform 180 may support an automated machine 110. The method 100 may further include indexing 102 the second automated machine with the tool 130 prior to depositing 108 composite material 139 onto the tool 130. In an example, the automated machines 110 located on the first mobile platform 120 and second mobile platform 140 may deposit composite material 139 onto tool 130 simultaneously. In an example, first mobile platform 120 and third mobile platform 180 may uncouple 112 from the second mobile platform 140 simultaneously or at different times. When the first mobile platform 120 and third mobile platform 180 do not uncouple simultaneously, the mobile platform that is still coupled with the second mobile platform 140 after the other mobile platform uncouples may continue to deposit composite material 139 while the uncoupled mobile platform moved to a predetermined location 169. In an example, predetermined location 169 may be a beginning location 165.

Figure 9:
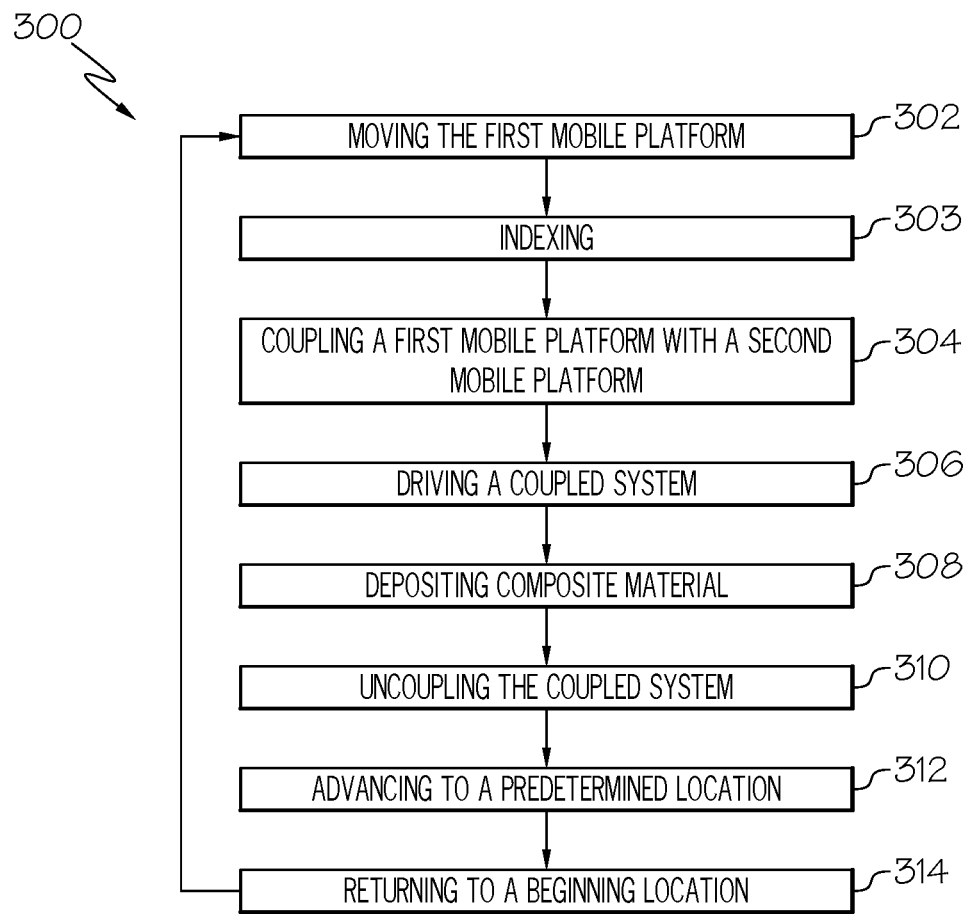
FIG. 9 is a flowchart illustrating a method for laminating composite components on a tool as shown in FIGS. 1 and 2.
Figure 15:
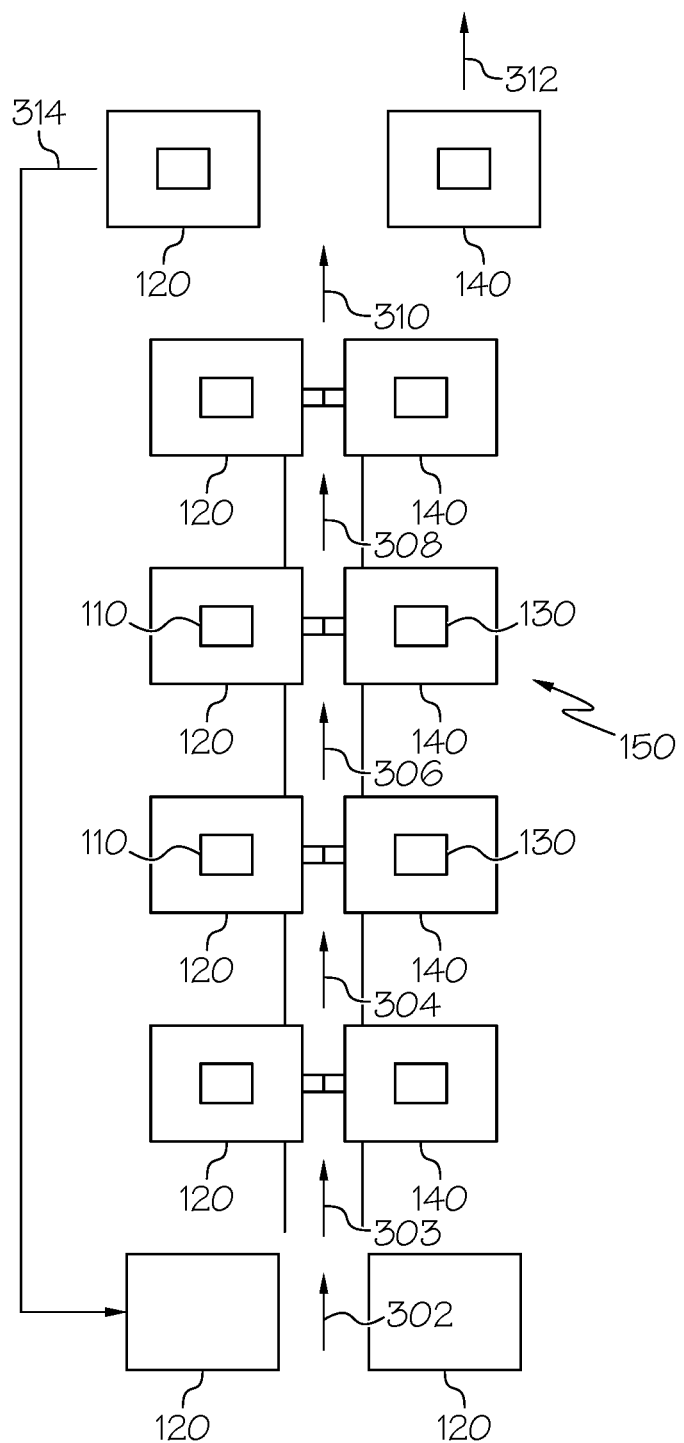
FIG. 15 is a plan view of a flow diagram of the method of FIG. 9.

Referring to FIG. 9, in one or more examples, a method 300 for laminating composite components on a tool 130 located on a second mobile platform 140 with an automated machine 110 located on a first mobile platform 120 is disclosed. In an example, the method 300 includes moving 302 the first mobile platform 120 to a predetermined location 169. The moving 302 may occur via a motion controller 195 coupled with first mobile platform 120. In an example, the predetermined location 169 may be proximate the second mobile platform 140 located in a station 400. In an example, one or more sensors 240 may be disposed on the first mobile platform 120, second mobile platform 140, motion controller 195, or a combination thereof. A controller 190 may be configured to receive the data collected from the one or more sensors and to determine the locations of the tool 130, automated machine 110, first mobile platform 120, and second mobile platform 140. The controller 190 may transmit a command 250 to initiate the moving 302 the first mobile platform 120 to the predetermined location 169. See FIG. 15.

In one or more examples, the method 300 may further include coupling 304 the first mobile platform 120 to a second mobile platform 140 to form a coupled system 150. Coupling 304 may be achieved with a coupling feature 170. Coupling feature 170 may include one or more of a gripper 178, a latch 188, a cup 172 and a cone 174, a hitch 184, a cam lock 186, a rail 182, and a trailer coupler 176. See FIG. 15.

In one example, the coupling feature 170 includes a cup 172 and a cone 174. The cup 172 and cone 174 may be affixed to either the first mobile platform 120 or the second mobile platform 140 and configured to nest together and join the first mobile platform 120 with the second mobile platform 140 and achieve coupling 304. In one example, the cup 172 may be located on the first mobile platform 120 and the cone 174 may be located on the second mobile platform 140. In one example, the cup 172 may be located on the second mobile platform 140 and the cone may be located on the first mobile platform 120. Cup 172 and cone 174 may couple manually via an operator 330 or couple automatically via instructions from a controller 190. Coupling feature 170 may include one or more sensors 240 to facilitate proper alignment of cup 172 with cone 174. A controller 190 may receive data collected from the one or more sensors 240 and utilize that data to control movement of the first mobile platform 120 and the second mobile platform 140 such that the cup 172 and cone 174 may couple and uncouple based upon instructions from one or more numerical control programs 290.

In one or more examples, the coupling feature 170 includes a hitch 184. Hitch 184 may include a first hitch portion 184a and a second hitch portion 184b. First hitch portion 184a may be located on either the first mobile platform 120 or the second mobile platform 140. Second hitch portion 184b may be located on the opposing mobile platform from which the first hitch portion 184a is located. First hitch portion 184a and second hitch portion 184b may be configured to nest or join in any suitable means to couple the first mobile platform 120 with the second mobile platform 140 to form a coupled system 150 and achieve coupling 304. First hitch portion 184a and second hitch portion 184b may couple manually via an operator 330 or couple automatically via instructions from a controller 190. Coupling feature 170 may include one or more sensors 240 to facilitate proper alignment of the first hitch portion 184a and second hitch portion 184b. A controller 190 may receive data collected from the one or more sensors 240 and utilize that data to control movement of the first mobile platform 120 and the second mobile platform 140 such that the first hitch portion 184a and second hitch portion 184b may couple and uncouple based upon instructions from one or more numerical control programs 290.

In one or more examples, the coupling feature 170 includes a trailer coupler 176. Trailer coupler 176 may include a first coupler portion 176a and a second coupler portion 176b. First coupler portion 176a may be located on either the first mobile platform 120 or the second mobile platform 140. Second coupler portion 176b may be located on the opposing mobile platform from which the first coupler portion 176a is located. First coupler portion 176a and second coupler portion 176b may be configured to nest or join via any suitable means to couple the first mobile platform 120 with the second mobile platform 140 to form a coupled system 150 and achieve coupling 304. First coupler portion 176a and second coupler portion 176b may couple manually via an operator 330 or couple automatically via instructions from a controller 190. Trailer coupler 176 may include one or more sensors 240 to facilitate proper alignment of first coupler portion 176a with second coupler portion 176b. A controller 190 may receive data collected from the one or more sensors 240 and utilize that data to control movement of the first mobile platform 120 and the second mobile platform 140 such that the first coupler portion 176a and the second coupler portion 176b may couple and uncouple based upon instructions from one or more numerical control programs 290.

In one or more examples, the coupling feature 170 includes a latch 188. Latch 188 may include a first latch portion 188a and a second latch portion 188b. First latch portion 188a may be located on either the first mobile platform 120 or the second mobile platform 140. Second latch portion 188b may be located on the opposing mobile platform from which first latch portion 188a is located. First latch portion 188a and second latch portion 188b may be configured to nest or join via any suitable means to couple the first mobile platform 120 with the second mobile platform 140 and achieve coupling 304. First latch portion 188a and second latch portion 188b may couple manually via an operator 330 or couple automatically via instructions from a controller 190. Latch 188 may further include one or more sensors 240 to facilitate proper alignment of first latch portion 188a with second latch portion 188b. A controller 190 may receive data collected from the one or more sensors 240 and utilize that data to control movement of the first mobile platform 120 and the second mobile platform 140 such that the first latch portion 188a and second latch portion 188b may couple and uncouple based upon instructions from one or more numerical control programs 290.

In one or more examples, the coupling feature 170 includes a gripper 178. Gripper 178 may include a gripping portion 178a and an indexing portion 178b. Gripping portion 178a may be located on either the first mobile platform 120 or the second mobile platform 140 and may include one or more indexing structure 179a. Indexing portion 178b may be located on the opposing mobile platform from which gripping portion 178a is located and may include one or more interfacing structures 179b. Indexing structure 179a may be configured to align and nest with interfacing structures 179b to couple first mobile platform 120 with second mobile platform 140 and achieve coupling 304. Gripping portion 178a and the indexing portion 178b may couple manually via an operator 330 or couple automatically via instructions from a controller 190. Gripper 178 may further include one or more sensors 240 to facilitate proper alignment of indexing structure 179a and interfacing structure 179b. A controller 190 may receive data collected from the one or more sensors 240 and utilize that data to control movement of the first mobile platform 120 and the second mobile platform 140 such that the gripping portion 178a and the indexing portion 178b may couple and uncouple based upon instructions from one or more numerical control programs 290.

In one or more examples, the coupling feature 170 includes a cam lock 186. Cam lock 186 may include a first locking portion 186a and a second locking portion 186b. First locking portion 186a may be located on either the first mobile platform 120 or the second mobile platform 140. Second locking portion 186b may be located on the opposing mobile platform from which the first locking portion 186a is located. First locking portion 186a and second locking portion 186b may be configured to connect or lock via any suitable means to couple the first mobile platform 120 with the second mobile platform 140 and achieve coupling 304. First locking portion 186a and second locking portion 186b may couple manually via an operator 330 or couple automatically via instructions from a controller 190. Cam lock 186 may further include one or more sensors 240 to facilitate proper alignment of first locking portion 186a with second locking portion 186b. A controller 190 may receive data collected from the one or more sensors 240 and utilize that data to control movement of the first mobile platform 120 and the second mobile platform 140 such that the first locking portion 186a and second locking portion 186b may couple and uncouple based upon instructions from one or more numerical control programs 290.

In one or more examples, the coupling feature 170 includes a rail 182. Rail 182 may include a rail portion 182a and a receiving portion 182b. Rail portion 182a may be located on the first mobile platform 120 or the second mobile platform 140. Receiving portion 182b may be located on the opposing mobile platform from which the rail portion 182a is located. The rail portion 182a and the receiving portion 182b may be configured to nest or join together via any suitable means to couple the first mobile platform 120 with the second mobile platform 140 and achieve coupling 304. The rail portion 182a and the receiving portion 182b may couple manually via an operator 330 or couple automatically via instructions from a controller 190. Rail 182 may further include one or more sensors 240 to facilitate proper alignment of rail portion 182a with receiving portion 182b. A controller 190 may receive data collected from the one or more sensors 240 and utilize that data to control movement of the first mobile platform 120 and the second mobile platform 140 such that the rail portion 182a and the receiving portion 182b may couple and uncouple based upon instructions from one or more numerical control programs 290.

The method 300 may further include indexing 303 the automated machine 110 relative to the tool 130. Indexing 303 may be achieved with an indexing feature 175. In an example, indexing 303 may further utilize one or more sensors 240. Indexing feature 175 may include one or more of a gripper 178, a latch 188, a cup 172 and a cone 174, a hitch 184, a cam lock 186, a rail 182, and a trailer coupler 176 as shown and described above and in the figures. In an example, indexing 303 and coupling 304 may occur simultaneously. In an example, indexing feature 175 and coupling feature 170 may be the same.

The method 300 may further include driving 306 the coupled system 150 along a production line 160 via one or more motion controllers 195. The production line 160 may be continuously moving. A motion controller 195 may be coupled with either the first mobile platform 120 or the second mobile platform 140 such that the coupled system 150 may be driven by either the first mobile platform 120 or the second mobile platform 140. In an example, a motion controller 195 may be coupled with both the first mobile platform 120 and the second mobile platform 140. The one or more motion controllers 195 may be in communication with controller 190. In an example, controller 190 may utilize one or more sensors 240 to determine when driving 306 occurs, the length of time driving 306 occurs, and where the coupled system 150 is driven. In an example, controller 190 may utilize one or more numerical control programs 290 do determine how long driving 306 occurs, and where the coupled system 150 is driven. In an example, driving 306 occurs manually via an operator 330.

In one or more examples, the method 300 includes depositing 308 composite materials 139 from the automated machine 110 to the tool 130 as the coupled system 150 is driven (driving 306) along the production line 160. Depositing 308 may include laying up composite material 139 to form a composite structure of a workpiece 135. In an example, the coupled system 150 may move continuously along the production line 160 or in pulses along the production line 160. Controller 190 may be configured to determine the amount of composite materials 139 to be deposited and location on the tool 130 where the depositing 308 should occur. Controller 190 may utilize one or more sensors 240 to determine depositing 308 parameters. In an example, controller 190 may utilize one or more numerical control programs 290 to determine depositing 308 parameters.

In one or more examples, the method 300 includes uncoupling 310 the coupled system 150 upon completion of the depositing 308 composite materials 139. The uncoupling 310 may be performed manually by an operator 330 or may be performed automatically based upon a command 250 received from a controller 190. Controller 190 may utilize data received from one or more sensors 240 to determine when uncoupling 310 occurs. In an example, controller 190 utilizes one or more numerical control programs 290 to determine when uncoupling 310 occurs. Controller 190 may utilize a combination of data collected from one or more sensors 240 and one or more numerical control programs 290 to determine when uncoupling 310 occurs.

In an example, the method 300 may further include returning 314 the first mobile platform 120 to a beginning location 165 along the production line 160. In an example, the returning 314 of method 300 may include moving the first mobile platform 120 to a predetermined location 169. Returning 314 may occur via one or more motion controllers 195. In an example, controller 190 may determine when returning 314 occurs based upon input received from one or more sensors 240, one or more numerical control programs 290, or a combination thereof. In an example, returning 314 may occur manually via an operator 330.

In an example, the method 300 may further include advancing 312 the second mobile platform 140 to a predetermined location 169. Advancing 312 may be driven by a motion controller 195. The motion controller 195 may initiate advancing 312 based upon a command 250 received from controller 190. Controller 190 may determine when advancing 312 occurs based upon input received from one or more sensors 240, one or more numerical control programs 290, or a combination thereof. In an example, advancing 312 may occur manually via an operator 330. The predetermined location 169 may be an autoclave 260. In an example, the method 300 may further include debulking 270 and consolidating 280 of the deposited composite materials 139.

In one or more examples, FIGS. 1 and 2 illustrate an apparatus 320 for laminating composite components on a production line 160. The production line 160 may be a continuous flow production line 160. The apparatus 320 may include an automated machine 110. The automated machine 110 may be located and mounted on a first mobile platform 120. The first mobile platform 120 may be configured to travel along the production line 160 continuously or in pulses. The first mobile platform may be driven by a motion controller 195. In an example, controller 190 may utilize a numerical control program 290 to control travel of the first mobile platform 120 along the production line 160.

In an example, the apparatus 320 may include a tool 130 located and mounted on a second mobile platform 140. The second mobile platform 140 may be configured to travel along the production line 160 continuously or in pulses. The second mobile platform may be driven by a motion controller 195. In an example, controller 190 may utilize a numerical control program 290 to control travel of the second mobile platform 140 along the production line 160.

In an example, the apparatus 320 may include a coupling feature 170. The coupling feature 170 may be configured to couple the first mobile platform 120 with the second mobile platform 140 such that the first mobile platform 120 and the second mobile platform 140 may travel along the production line 160 as a coupled system 150. Coupling feature 170 may include one or more of a gripper 178, a latch 188, a cup 172 and a cone 174, a hitch 184, a cam lock 186, a rail 182, and a trailer coupler 176. In an example, coupling feature 170 includes one or more sensors 240 to facilitate precision when coupling the first mobile platform 120 with the second mobile platform 140.

In an example, coupling feature 170 may include a gripper 178. Gripper 178 may include a gripping portion 178a and an indexing portion 178b. Gripping portion 178a may be located on either the first mobile platform 120 or the second mobile platform 140 and may include one or more indexing structure 179a. Indexing portion 178b may be located on the opposing mobile platform from which gripping portion 178a is located and may include one or more interfacing structures 179b. Indexing structure 179a may be configured to align and nest with interfacing structures 179b to couple first mobile platform 120 with second mobile platform 140. Gripping portion 178a and the indexing portion 178b may couple manually via an operator 330 or couple automatically via instructions from a controller 190. Gripper 178 may further include one or more sensors 240 to facilitate proper alignment of indexing structure 179a and interfacing structure 179b. A controller 190 may receive data collected from the one or more sensors 240 and utilize that data to control movement of the first mobile platform 120 and the second mobile platform 140 such that the gripping portion 178a and the indexing portion 178b may couple and uncouple based upon instructions from one or more numerical control programs 290.

In an example, coupling feature 170 may include a latch 188. Latch 188 may include a first latch portion 188a and a second latch portion 188b. First latch portion 188a may be located on either the first mobile platform 120 or the second mobile platform 140. Second latch portion 188b may be located on the opposing mobile platform from which first latch portion 188a is located. First latch portion 188a and second latch portion 188b may be configured to nest or join via any suitable means to couple the first mobile platform 120 with the second mobile platform 140. First latch portion 188a and second latch portion 188b may couple manually via an operator 330 or couple automatically via instructions from a controller 190. Latch 188 may further include one or more sensors 240 to facilitate proper alignment of first latch portion 188a with second latch portion 188b. A controller 190 may receive data collected from the one or more sensors 240 and utilize that data to control movement of the first mobile platform 120 and the second mobile platform 140 such that the first latch portion 188a and second latch portion 188b may couple and uncouple based upon instructions from one or more numerical control programs 290.

In an example, coupling feature 170 may include a cup 172 and a cone 174. The cup 172 and cone 174 may be affixed to either the first mobile platform 120 or the second mobile platform 140 and configured to nest together and join the first mobile platform 120 with the second mobile platform 140. In one example, the cup 172 may be located on the first mobile platform 120 and the cone 174 may be located on the second mobile platform 140. In one example, the cup 172 may be located on the second mobile platform 140 and the cone may be located on the first mobile platform 120. Cup 172 and cone 174 may couple manually via an operator 330 or couple automatically via instructions from a controller 190. Coupling feature 170 may include one or more sensors 240 to facilitate proper alignment of cup 172 with cone 174. A controller 190 may receive data collected from the one or more sensors 240 and utilize that data to control movement of the first mobile platform 120 and the second mobile platform 140 such that the cup 172 and cone 174 may couple and uncouple based upon instructions from one or more numerical control programs 290.

In an example, coupling feature 170 may include a hitch 184. Hitch 184 may include a first hitch portion 184a and a second hitch portion 184b. First hitch portion 184a may be located on either the first mobile platform 120 or the second mobile platform 140. Second hitch portion 184b may be located on the opposing mobile platform from which the first hitch portion 184a is located. First hitch portion 184a and second hitch portion 184b may be configured to nest or join in any suitable means to couple the first mobile platform 120 with the second mobile platform 140 to form 106 a coupled system 150. First hitch portion 184a and second hitch portion 184b may couple manually via an operator 330 or couple automatically via instructions from a controller 190. Coupling feature 170 may include one or more sensors 240 to facilitate proper alignment of the first hitch portion 184a and second hitch portion 184b. A controller 190 may receive data collected from the one or more sensors 240 and utilize that data to control movement of the first mobile platform 120 and the second mobile platform 140 such that the first hitch portion 184a and second hitch portion 184b may couple and uncouple based upon instructions from one or more numerical control programs 290.

In an example, coupling feature 170 may include a cam lock 186. Cam lock 186 may include a first locking portion 186a and a second locking portion 186b. First locking portion 186a may be located on either the first mobile platform 120 or the second mobile platform 140. Second locking portion 186b may be located on the opposing mobile platform from which the first locking portion 186a is located. First locking portion 186a and second locking portion 186b may be configured to connect or lock via any suitable means to couple the first mobile platform 120 with the second mobile platform 140. First locking portion 186a and second locking portion 186b may couple manually via an operator 330 or couple automatically via instructions from a controller 190. Cam lock 186 may further include one or more sensors 240 to facilitate proper alignment of first locking portion 186a with second locking portion 186b. A controller 190 may receive data collected from the one or more sensors 240 and utilize that data to control movement of the first mobile platform 120 and the second mobile platform 140 such that the first locking portion 186a and second locking portion 186b may couple and uncouple based upon instructions from one or more numerical control programs 290.

In an example, coupling feature 170 may include a rail 182. Rail 182 may include a rail portion 182a and a receiving portion 182b. Rail portion 182a may be located on the first mobile platform 120 or the second mobile platform 140. Receiving portion 182b may be located on the opposing mobile platform from which the rail portion 182a is located. The rail portion 182a and the receiving portion 182b may be configured to nest or join together via any suitable means to couple the first mobile platform 120 with the second mobile platform 140. The rail portion 182a and the receiving portion 182b may couple manually via an operator 330 or couple automatically via instructions from a controller 190. Rail 182 may further include one or more sensors 240 to facilitate proper alignment of rail portion 182a with receiving portion 182b. A controller 190 may receive data collected from the one or more sensors 240 and utilize that data to control movement of the first mobile platform 120 and the second mobile platform 140 such that the rail portion 182a and the receiving portion 182b may couple and uncouple based upon instructions from one or more numerical control programs 290.

In an example, coupling feature 170 may include a trailer coupler 176. Trailer coupler 176 may include a first coupler portion 176a and a second coupler portion 176b. First coupler portion 176a may be located on either the first mobile platform 120 or the second mobile platform 140. Second coupler portion 176b may be located on the opposing mobile platform from which the first coupler portion 176a is located. First coupler portion 176a and second coupler portion 176b may be configured to nest or join via any suitable means to couple the first mobile platform 120 with the second mobile platform 140 and form 106 a coupled system 150. First coupler portion 176a and second coupler portion 176b may couple manually via an operator 330 or couple automatically via instructions from a controller 190. Trailer coupler 176 may include one or more sensors 240 to facilitate proper alignment of first coupler portion 176a with second coupler portion 176b. A controller 190 may receive data collected from the one or more sensors 240 and utilize that data to control movement of the first mobile platform 120 and the second mobile platform 140 such that the first coupler portion 176a and the second coupler portion 176b may couple and uncouple based upon instructions from one or more numerical control programs 290.

In one or more examples, the apparatus 320 may include an indexing feature 175. Indexing feature 175 may be configured to index and align automated machine 110 relative to the tool 130. Indexing feature 175 may include one or more of a gripper 178, a latch 188, a cup 172 and a cone 174, a hitch 184, a cam lock 186, a rail 182, and a trailer coupler 176 as shown and described above and in the figures. In an example, indexing feature 175 and coupling feature 170 are the same such that coupling and indexing occur simultaneously. In an example, indexing feature 175 includes one or more sensors 240.

In one or more examples, apparatus 320 includes a motion controller 195 coupled with either the first mobile platform 120 or the second mobile platform 140. In an example, apparatus 320 includes a controller 190 configured to detect a position of the first mobile platform 120, a position of the second mobile platform 140, and a status of the automated machine 110 via one or more sensors 240 located throughout the apparatus 320. The controller 190 may further be configured to analyze data collected from sensors 240 located on the apparatus 320.

In an example, the controller 190 is configured to control a status of the coupling feature 170, control travel parameters of the first mobile platform 120, and control travel parameters of the second mobile platform 140. The controller 190 may utilize a numerical control program 290, sensors 240, a GPS 220, a laser 230, a barcode 197, or any other suitable means of collecting and analyzing data to determine travel parameters. In an example, the first mobile platform 120 and the second mobile platform 140 are configured to travel independently of each other when in an uncoupled state with the one or more motion controllers 195.

Figure 13:
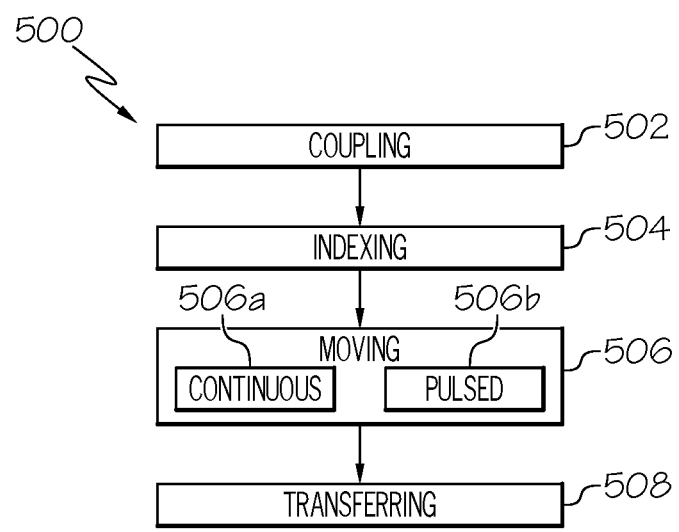
FIG. 13 is a flowchart illustrating a method for manufacturing a workpiece.

FIG. 13 illustrates an exemplary flowchart for a method 500. In one or more examples, a method 500 for manufacturing a workpiece 135 is disclosed. In an example, the method 500 comprises coupling 502 a first mobile platform 120 with a second mobile platform 140 to form a coupled system 150. In an example, the first mobile platform 120 may support or hold an automated machine 110. In an example, the second mobile platform 140 may support the workpiece 135. The workpiece 135 may be located on a tool 130. The method 500 may further comprise indexing 504 the automated machine 110 relative to the workpiece 135. In an example, the method 500 comprises moving 506 along a production line 160. Moving may be continuous 506a or pulsed 506b. In an example, the method 500 comprises transferring 508 composite material 139 from the automated machine 110 onto the workpiece 135.

Figure 12:
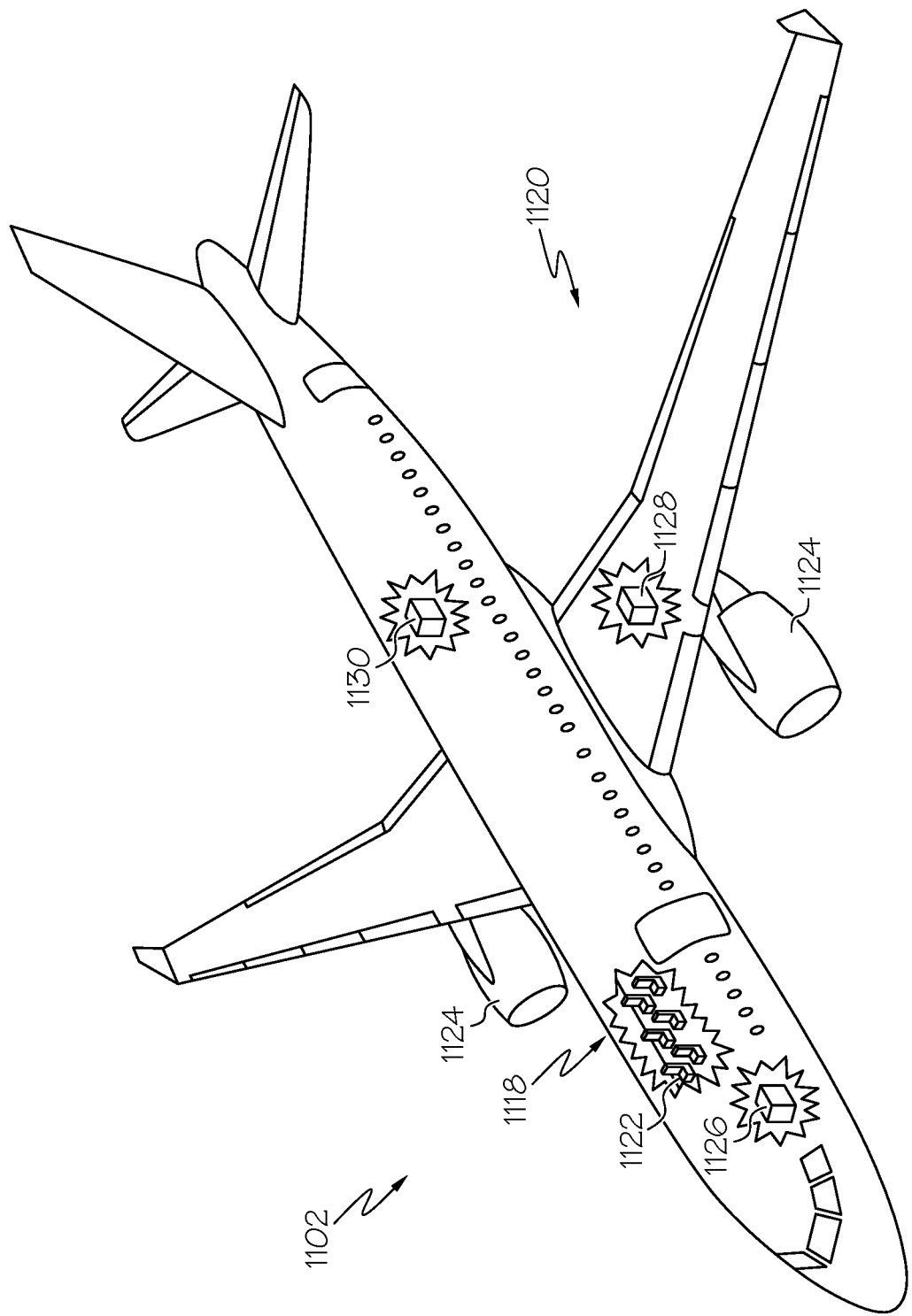
FIG. 12 is a block diagram of an aircraft.

Examples of the disclosure may be described in the context of an aircraft manufacturing and service method 1100, as shown in FIG. 11, and an aircraft 1102, as shown in FIG. 12. During pre-production, the aircraft manufacturing and service method 1100 may include specification and design 1104 of the aircraft 1102 and material procurement 1106. During production, component/subassembly manufacturing 1108 and system integration 1110 of the aircraft 1102 takes place. Thereafter, the aircraft 1102 may go through certification and delivery 1112 in order to be placed in service 1114. While in service by a customer, the aircraft 1102 is scheduled for routine maintenance and service 1116, which may also include modification, reconfiguration, refurbishment, and the like.

Each of the steps of method 1100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 12, the aircraft 1102 produced by example method 1100 may include an airframe 1118 with a plurality of systems 1120 and an interior 1122. Examples of the plurality of systems 1120 may include one or more of a propulsion system 1124, an electrical system 1126, a hydraulic system 1128, and an environmental system 1130. Any number of other systems may be included.

The disclosed methods and systems may be employed during any one or more of the stages of the aircraft manufacturing and service method 1100. As one example, components or subassemblies corresponding to component/subassembly manufacturing 1108, system integration 1110 and/or maintenance and service 1116 may be assembled using the disclosed methods and systems. As another example, the airframe 1118 may be constructed using the disclosed methods and systems. Also, one or more apparatus examples, method examples, or a combination thereof may be utilized during component/subassembly manufacturing 1108 and/or system integration 1110, for example, by substantially expediting assembly of or reducing the cost of an aircraft 1102, such as the airframe 1118 and/or the interior 1122. Similarly, one or more of system examples, method examples, or a combination thereof may be utilized while the aircraft 1102 is in service, for example and without limitation, to maintenance and service 1116.

Aspects of disclosed examples may be implemented in software, hardware, firmware, or a combination thereof. The various elements of the system, either individually or in combination, may be implemented as a computer program product tangibly embodied in a machine-readable storage device for execution by a processor. Various steps of examples may be performed by a computer processor executing a program tangibly embodied on a computer-readable medium to perform functions by operating on input and generating output. The computer-readable medium may be, for example, a memory, a transportable medium such as a compact disk or a flash drive, such that a computer program embodying aspects of the disclosed examples can be loaded onto a computer.

The above-described methods and systems are described in the context of an aircraft. However, one of ordinary skill in the art will readily recognize that the disclosed methods and systems are suitable for a variety of applications, and the present disclosure is not limited to aircraft manufacturing applications. For example, the disclosed methods and systems may be implemented in various types of vehicles including, for example, helicopters, passenger ships, automobiles, marine products (boat, motors, etc.) and the like. Non-vehicle applications are also contemplated.

Also, although the above-description describes methods and systems that may be used to manufacture an aircraft or aircraft component in the aviation industry in accordance with various regulations (e.g., commercial, military, etc.), it is contemplated that the disclosed methods and systems may be implemented to facilitate manufacturing of a part in any industry in accordance with the applicable industry standards. The specific methods and systems can be selected and tailored depending upon the particular application.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the manufacturing system 200, the apparatus 320, the method 300, and the method 100 have been shown and described, modifications may occur to those skilled in the art upon reading the specification. The present application includes such modifications and is limited only by the scope of the claims.

What is claimed is:

1. A method for facilitating continuous flow manufacturing of composite structures for aircraft, the method comprising:
    moving a first mobile platform along a continuous production line, the first mobile platform supporting a mandrel configured to hold a workpiece;
    coupling a second mobile platform and a third mobile platform with the first mobile platform to form a coupled system, wherein the second mobile platform and the third mobile platform each support an automated fiber placement machine;
    moving the coupled system along the continuous production line;
    depositing composite material onto the mandrel using the automated fiber placement machines on the second mobile platform and the third mobile platform while the coupled system travels along the continuous production line; and
    uncoupling the second mobile platform from the coupled system, wherein the third mobile platform continues to deposit composite material onto the mandrel after the second mobile platform is uncoupled.

2. The method of claim 1, wherein the coupling of the second and third mobile platforms with the first mobile platform is achieved using at least one of a hitch, latch, rail, trailer coupler, or cam lock.

3. The method of claim 1, further comprising indexing the automated fiber placement machines on the second and third mobile platforms relative to the mandrel before depositing the composite material.

4. The method of claim 1, wherein the movement of the coupled system along the production line is controlled by a motion controller.

5. The method of claim 1, wherein the automated fiber placement machines utilize sensors to align the composite material deposition accurately onto the mandrel.

6. The method of claim 1, wherein the continuous production line includes a railway configured for guiding the movement of the first, second, and third mobile platforms.

7. The method of claim 1, wherein the continuous production line is curved to form a looped configuration.

8. The method of claim 1, wherein the composite material comprises thermoplastic resin.

9. The method of claim 1, wherein the coupling and uncoupling of the mobile platforms are controlled by a wireless command from a centralized controller.

10. The method of claim 1, further comprising returning the first mobile platform to a starting position after uncoupling.

11. The method of claim 1, wherein the first, second, and third mobile platforms are configured to travel independently of each other when in an uncoupled state.

12. The method of claim 1, wherein the coupled system moves continuously along the production line during the composite material deposition.

13. The method of claim 1, wherein the coupled system moves in a pulsed manner along the production line during the composite material deposition.

14. The method of claim 1, wherein the composite material is deposited in multiple layers with varying fiber orientations.

15. The method of claim 1, further comprising uncoupling of the third mobile platform after the second mobile platform has been uncoupled.

16. The method of claim 1, wherein the movement of the mobile platforms along the production line is guided by a global positioning system (GPS).

17. The method of claim 1, further comprising advancing the first mobile platform to an autoclave after uncoupling.

18. The method of claim 1, wherein the automated fiber placement machines on the second and third mobile platforms deposit the composite material simultaneously onto the mandrel.

19. The method of claim 1, wherein the coupling of the second and third mobile platforms with the first mobile platform also indexes the automated fiber placement machines relative to the mandrel.

20. The method of claim 1, wherein the coupling and uncoupling of the second and third mobile platforms with the first mobile platform are performed automatically via a controller.

* * * * *